United States Patent [19]
Ito et al.

[11] Patent Number: 6,084,748
[45] Date of Patent: Jul. 4, 2000

[54] MAGNETIC DISC APPARATUS WITH A MAGNETIC SPACE MEMBER

[75] Inventors: Wataru Ito; Tatsuhiko Shigemoto; Yutaka Souda, all of Kanagawa; Masayoshi Fujita, Miyagi, all of Japan

[73] Assignee: Sony Corporation, Tokyo, Japan

[21] Appl. No.: 09/135,832

[22] Filed: Aug. 18, 1998

[30] Foreign Application Priority Data

Aug. 18, 1997 [JP] Japan ................................. 9-221818
Aug. 18, 1997 [JP] Japan ................................. 9-221819

[51] Int. Cl.$^7$ ............................. G11B 5/58; G11B 5/133
[52] U.S. Cl. ............................................ 360/104; 360/103
[58] Field of Search ................................. 360/103, 104, 360/99.01, 125, 128

[56] References Cited

U.S. PATENT DOCUMENTS

| | | | |
|---|---|---|---|
| 5,187,624 | 2/1993 | Shigemoto | 360/104 |
| 5,327,309 | 7/1994 | Takamiya et al. | 360/99.02 |
| 5,367,419 | 11/1994 | Kazama | 360/103 |
| 5,485,336 | 1/1996 | Matsunaga | 360/125 |
| 5,677,814 | 10/1997 | Osaka | 360/104 |
| 5,793,570 | 8/1998 | Osaka | 360/104 |
| 5,877,910 | 3/1999 | Williams et al. | 360/66 |
| 5,907,457 | 5/1999 | Kudo et al. | 360/103 |

FOREIGN PATENT DOCUMENTS 3-192569  8/1991  Japan .

*Primary Examiner*—Jefferson Evans
*Attorney, Agent, or Firm*—Limbach & Limbach L.L.P.

[57] ABSTRACT

A magnetic disc apparatus capable of selectively driving at least two types of the magnetic discs having signal recording portions on their major surfaces and having different recording densities. The magnetic disc apparatus includes a main head carriage mounted for movement on a base block, a supporting arm having its one end supported by a main head carriage, and a magnetic head having a first transducer having a slider, and a first core and adapted for accessing information signals at a first recording density, and a second transducer having a second core and adapted for accessing information signals at a second recording density higher than the first recording density. A magnetic gap for the first transducer and a magnetic gap for the second transducer are formed on the surface of the magnetic head facing the major surface of the magnetic disc. The magnetic disc apparatus also includes a flat-plate-shaped pivoting member for pivotably supporting the magnetic head in a state in which the slider and the base block are disposed on one and the opposite sides of the pivoting member. The magnetic head is changed in its posture to the magnetic disc to follow surface deviation of the magnetic disc produced during driving to achieve correct accessing of the magnetic disc by the magnetic head.

22 Claims, 26 Drawing Sheets

R →

MAGNETIC DISC APPARATUS WITH A MAGNETIC SPACE MEMBER

BACKGROUND OF THE INVENTION

1. Field of the Invention

This invention relates to a disc apparatus for recording and/or reproducing information signals on a magnetic disc having a signal recording portion on its major surface. The present invention can be applied in particular to a magnetic disc apparatus for recording and/or reproducing information signals in a state in which the magnetic head is floated from the signal recording portion of the magnetic disc being run in rotation.

2. Description of Related Art

Up to now, a magnetic disc apparatus employing, as a recording medium, a magnetic disc, with a diameter of 3.5-inch floppy disc inch, having a signal recording portion on the major surface of a disc substrate formed of flexible synthetic resin, has been in use.

A magnetic disc 1 used in this magnetic disc apparatus has, in its center, a hub 2 comprised of a thin stainless steel plate. In the center area of the hub 2 is formed a spindle hole 3 passed through by a spindle 16 of a disc rotation unit 15 provided on the magnetic disc apparatus. At a position offset from the spindle hole 3 of the hub 2 is formed a driving pin engagement hole 4 engaged by a driving pin 17 of the disc rotation unit 15.

The magnetic disc 1 having the flexible disc substrate tends to be damaged by the slightest external force. Moreover, information signals cannot be recorded/reproduced correctly if contaminants are deposited thereon. The magnetic disc of this sort is constituted as a disc cartridge by being housed within a main cartridge body unit 7, formed on abutting and connecting an upper cartridge half and a lower cartridge half in order to prevent possible damage and deposition of contaminants. The magnetic disc 1, housed within the main cartridge body unit 7, is loaded as it is contained in the main cartridge body unit 7 on the magnetic disc apparatus, or is kept in store.

In a mid portion on the lower surface of the main cartridge body unit 7 housing the magnetic disc 1 is formed a circular center opening 9 via which a hub 2 formed at the center of the magnetic disc 1 is exposed to outside. In the upper and lower surfaces of the main cartridge body unit 7 are formed paired facing recording and/or reproducing apertures 10, 11 for extending from the vicinity of the center opening 9 to the front side so that a portion of the signal recording portion of the magnetic disc is exposed to outside across the inner and outer rims of the disc.

Although not shown, a shutter for opening or closing the recording and/or reproducing apertures is movably mounted on the main cartridge body unit 7.

On the magnetic disc apparatus on which to load the above-described disc cartridge is mounted a disc rotation unit 15 adapted for running the magnetic disc 1 housed in the disc cartridge 8 in rotation. The disc rotation unit 15 includes a spindle motor, mounted on a base, not shown, provided in the main body portion of the apparatus, and a disc table 20 mounted on the distal end of the spindle 19 of the spindle motor for rotation in unison therewith, as shown in FIG. 1. On the surface of the disc table 20, on which to set the magnetic disc 1, there is mounted a magnet 21 for sucking the hub 2 mounted on the magnetic disc 1. On the magnetic disc setting surface of the disc table 20 at a position offset from the spindle 19 is protuberantly formed the driving pin 17 engaged in the driving pin engagement hole 4 formed in the hub 2. The driving pin 17 is biased towards the outer rim of the disc table 20 by a biasing member, such as a tension spring, not shown.

When the disc cartridge 8 is loaded in position on the cartridge loading unit in the magnetic disc apparatus, the hub 2 is set on the disc table 20 under the suction by the magnet 21. The spindle 19 is inserted through the spindle hole 3, with the driving pin 17 being intruded into the driving pin engagement hole 4. If the driving of the spindle motor is started, the driving pin 17 compresses against the spindle 19 to center the magnetic disc 1 relative to the spindle 19, with the magnetic disc 1 being run in rotation in the main cartridge body unit 7 in unison with the disc table 20.

Meanwhile, the magnetic disc 1, set on the disc table 20 for rotation in unison therewith, is rotated at an approximately mid height position between the upper and lower sides of the main cartridge body unit 7, because the disc cartridge 8 housing the magnetic disc 1 is loaded on the cartridge loading unit in position in the height-wise direction. That is, the magnetic disc 1 is run in rotation in a manner free of contact with the upper or lower inner surfaces of the main cartridge body unit 7.

The magnetic disc apparatus is provided with a magnetic head apparatus 25 for recording and/or reproducing information signals on or from the magnetic disc 1 run in rotation by the disc rotation unit. Referring to FIG. 1, the magnetic disc apparatus 25 includes a main carriage member 26, mounted on a base, not shown, for movement radially of the magnetic disc 1 set on the disc table 20, and adapted for being fed radially of the magnetic disc by a feed mechanism, not shown. On the lower end of the main carriage member 26 is protuberantly formed a first head supporting arm 27 extended towards the lower surface of the magnetic disc 1 set on the disc table 20. On the upper end face of the main carriage member 26, the proximal end of a second head supporting arm 28, extending for facing the first head supporting arm 27 on the upper surface of the magnetic disc 1 set on the disc table 20, is mounted via a spring plate 29 for rotation towards and away from the magnetic disc 1.

Meanwhile, the second head supporting arm 28 is rotationally biased so that its distal end approaches to the magnetic disc 1 on the disc table 20 under the bias of the spring plate 29.

On opposing surfaces of the distal ends of the first and second head supporting arms 27, 28, extended on the upper and lower surfaces of the magnetic disc 1, are mounted first and second magnetic heads 29, 30. These first and second magnetic heads 29, 30 are each of a height Hl such that the magnetic heads 29, 30 are intruded via the recording and/or reproducing apertures 10, 11 into the main cartridge body unit 7 of the disc substrate 8 loaded in position in the height-wise direction on the cartridge loading unit into contact with both major surfaces of the magnetic disc being run in rotation in the main cartridge body unit 7, as shown in FIG. 1. That is, the first and second magnetic heads 29, 30 are each of a height Hl such that the magnetic heads 29, 30 are intruded into the main cartridge body unit 7 into contact with both major surfaces of the magnetic disc being run in rotation at an intermediate position between the upper and lower surfaces of the main cartridge body unit 7, without permitting the first and second head supporting arms 27, 28 extended on the upper and lower sides of the main cartridge body unit 7 to be contacted with the main cartridge body unit 7.

Meanwhile, the second head supporting arm 28, extended on the upper side of the disc cartridge 8 loaded on the cartridge loading unit, is uplifted and lowered, by a head lift mechanism, not shown, between an uplifted position spaced apart from the first head supporting arm 27 as indicated by a broken line in FIG. 1, and a lowered position, close to the first head supporting arm 27, in which the second magnetic head 30 on the distal end of the arm 28 is contacted with the magnetic disc 1 loaded on the disc table 20, as indicated by a solid line in FIG. 1.

The first and second magnetic heads 29, 30 are mounted on the distal ends of the first and second head supporting arms 27, 28 via a thin-plate-shaped gimbal spring 31 flexible in two mutually perpendicular directions, as shown in FIG. 2. The gimbal spring 31 is formed by punching a spring plate. The gimbal spring 31 has the center in its surface opposite to the surface carrying the first and second magnetic heads 29, 30 supported by a pivot 32 protuberantly formed on the first and second head supporting arms 27, 28. The first and second magnetic heads 29, 30, supported by a pivot 32, is rotationally displaced in the direction indicated by arrows A and/or B in FIG. 2 so as to follow up with the elastic deformation of the gimbal spring 31 about the pivot 32 as center.

When recording and/or reproducing information signals on or from the magnetic disc 1, the first and second magnetic heads 29, 30 are kept in sliding contact with the both major surfaces of the magnetic disc 1, run in rotation in unison with the disc table 20, as shown in FIG. 1. During rotation of the magnetic disc 1, surface deviation of the disc from the plane of rotation, in which the magnetic disc is deviated in the up-and-down direction, without being rotated in the in-plane direction, tends to be produced. In case of occurrence of the deviation of the disc from the plane of rotation, the first and second magnetic heads 29, 30 are rotationally displaced in the direction indicated by arrows A and/or B in FIG. 2, so as to follow up with the displacement of the magnetic disc 1, in order to keep the state of stable sliding contact with the magnetic disc 1. Thus, the first and second magnetic heads 29, 30 can correctly access the recording track formed on the signal recording portion of the magnetic disc 1 to reproduce the information signals.

The first and second magnetic heads 29, 30 of the magnetic disc apparatus are of a height H1 sufficient to permit the magnetic heads to be intruded into the main cartridge body unit 7 into contact with both major surfaces of the magnetic disc run in rotation in a mid position between the upper and lower sides of the main cartridge body unit 7, and are mounted on the first and second head supporting arms 27, 28 by having the proximal ends supported by the gimbal spring 31, so that the magnetic heads can be rotationally displaced significantly about the proximal ends as supporting portions for the gimbal spring 31 as center. Thus, if external disturbances are applied to the first and second head supporting arms 27, 28, the first and second magnetic heads 29, 30 tend to be rotationally displaced significantly in the direction indicated by arrows A and/or B in FIG. 2 about the proximal ends thereof as center. If the first and second magnetic heads 29, 30 are rotationally displaced significantly in this manner, the magnetic heads are deviated from the recording track to be accessed so that it becomes impossible to realize tracking of the recording track and hence correct recording/reproduction of information signals.

There is currently proposed a magnetic disc used as a recording medium for the magnetic disc apparatus having a recording capacity of from 2 megabyte as in the conventional magnetic disc up to tens to hundreds of megabyte. In this sort of the high capacity magnetic disc, the track width is reduced, at the same time as the track pitch is reduced, for increasing the density of recording tracks formed in its signal recording portion. If, in a magnetic disc apparatus employing a magnetic disc reduced both in the track width and track pitch of the recording tracks, the magnetic heads are deviated from the recording track to be accessed by the slightest rotational displacement of the magnetic head, the magnetic head cease to be able to follow up with disc displacement caused by disturbances, such that a predetermined recording track cannot be followed to disable correct recording/reproduction of information signals.

On the other hand, the magnetic disc increased in the recording capacity is run in rotation at an rpm not less than 3000 rpm. If the magnetic head is kept in sliding contact with the magnetic disc, run in rotation at an elevated speed, both the magnetic disc and the magnetic head kept in sliding contact with each other are attrited significantly and hence are deteriorated in durability. In a magnetic disc apparatus in which the magnetic head is floated from the magnetic disc during recording/reproduction of information signals, the magnetic head supported by the gimbal spring readily undergoes rotational deviation by the slightest disturbances applied to the supporting arm supporting the magnetic head. The magnetic head having the above-mentioned larger height and supported by the head supporting arm by having the proximal end supported by the gimbal spring, the magnetic head is rotationally displaced significantly without following up with displacement of the magnetic disc. Thus, the magnetic head is offset from the recording track to be accessed to disable tracking of a pre-set recording track and hence correct recording/reproduction of information signals.

SUMMARY OF THE INVENTION

It is therefore an object of the present invention to provide a novel magnetic disc apparatus which eliminates problems inherent in the conventional magnetic disc apparatus.

It is another object of the present invention to provide a magnetic disc apparatus whereby a recording track of a rotating magnetic disc can be correctly accessed by the magnetic head without detracking.

It is a further object of the present invention to provide a magnetic disc apparatus whereby the recording track of the magnetic disc reduced in track width and track pitch can be accessed correctly in order to achieve correct recording/reproduction of information signals.

It is a further object of the present invention to provide a magnetic disc apparatus whereby plural sorts of the magnetic discs having different recording densities can be selectively used to realize recording of information signals to a high recording density, and whereby, even if a magnetic disc reduced in both the track width and the track pitch is used, the recording track can be accessed reliably to realize correct recording/reproduction of information signals It is yet another object of the present invention to provide a magnetic disc apparatus whereby the magnetic head can be protected and whereby the magnetic disc run in rotation as it is housed in the main cartridge body unit can be reliably accessed by the magnetic head.

In one aspect, the present invention provides a magnetic disc apparatus for driving a magnetic disc having a signal recording portion on its major surface, including a base block, a main head carriage mounted for movement on the base block, a supporting arm having its one end supported by the main head carriage, a spacer mounted on a side on the opposite end of the supporting arm facing the magnetic disc, a pivoting member having a portion for mounting and a pivoting portion pivotable relative to the portion for mounting, and a magnetic head supported by the pivoting portion of the pivoting member. The portion for mounting is mounted at a position of the spacer spaced a predetermined distance from the supporting arm in a direction perpendicular to the major surface of the magnetic disc.

Preferably, the magnetic disc is rotatably housed in a cartridge and a portion of the major surface of the magnetic disc is exposed to outside via an aperture formed in the cartridge.

Preferably, the pivoting portion is a flat-plate-shaped member, on one surface of which is supported the magnetic head, and a pivot for supporting a point of the opposite surface of the pivoting portion is provided on the spacer.

The magnetic disc apparatus preferably further includes a disc holding member for detachably holding a first magnetic disc for recording information signals at a first recording density or a second magnetic disc for recording information signals at a second recording density higher than the first recording density. The magnetic head has a first transducer for accessing the first magnetic disc and a second transducer for accessing the second magnetic disc.

Preferably, the magnetic head has a slider and a base block and is supported by the pivoting portion in such a state in which the slider is positioned on the side of the pivoting member opposite to the supporting arm for facing the magnetic disc and in which the base block is positioned on the side of the pivoting member towards the supporting arm.

The magnetic disc apparatus preferably further includes a disc holding member for detachably holding a first magnetic disc for recording information signals at a first recording density or a second magnetic disc for recording information signals at a second recording density higher than the first recording density. The magnetic head has a first transducer for accessing the first magnetic disc and a second transducer for accessing the second magnetic disc. A core of the first transducer is formed on the base block and a core of the second transducer is formed on the slider.

In another aspect, the present invention provides a magnetic disc apparatus for driving a magnetic disc having a signal recording portion on its major surface, including a base block, a main head carriage mounted for movement on the base block, a supporting arm having its one end supported by the main head carriage, a magnetic head and a supporting member mounted at a predetermined spacing from a side on the opposite end of the supporting arm facing the major surface of the magnetic disc, in a direction perpendicular to the major surface of the magnetic disc. The supporting member operates for orienting the magnetic head so as to follow the major surface of the magnetic disc.

In a further aspect, the present invention provides a magnetic disc apparatus for driving a magnetic disc having a signal recording portion on its major surface, including a base block, a main head carriage mounted for movement on the base block, a supporting arm having its one end supported by the main head carriage, a magnetic head including a slider, a base block, a first transducer having a first core and adapted for accessing information signals at a first recording density, and a second transducer having a second core and adapted for accessing information signals at a second recording density higher than the first recording density, and a flat-plate-shaped pivoting member for pivotably supporting the magnetic head with respect to the supporting arm so that the slider and the base block are disposed towards on& and the opposite surfaces of the pivoting member. A magnetic gap of the first transducer and a magnetic gap of the second transducer are formed on a surface of the magnetic head facing the major surface of the magnetic disc. The first core is arranged on the base block and the second core is arranged in the slider.

With the magnetic disc apparatus of the present invention, in which the magnetic head supported on the distal end of the head supporting arm is supported via a pivoting member, it is pivotally displaced to follow surface deviation produced on rotationally driving the magnetic disc so that the major surface carrying the signal recording portion of the magnetic disc can be accessed as a constant floating state of the magnetic head from the major surface of the magnetic disc is maintained, with the result that information signals can be correctly recorded or reproduced without producing detracking.

In particular, the magnetic head is supported on the distal end of the head supporting arm via a pivoting member assembled at a mid portion along the height relative to the magnetic disc, so that, if the magnetic head is pivotally deviated due to vibrations applied from outside the main body unit of the apparatus or from the rotating disc, the magnetic head is subjected to only small force of rotation to prevent accessing of the signal recording portion of the magnetic disc from being affected to enable recording/reproduction of information signals.

DESCRIPTION OF THE PREFERRED EMBODIMENTS

Figure 1:
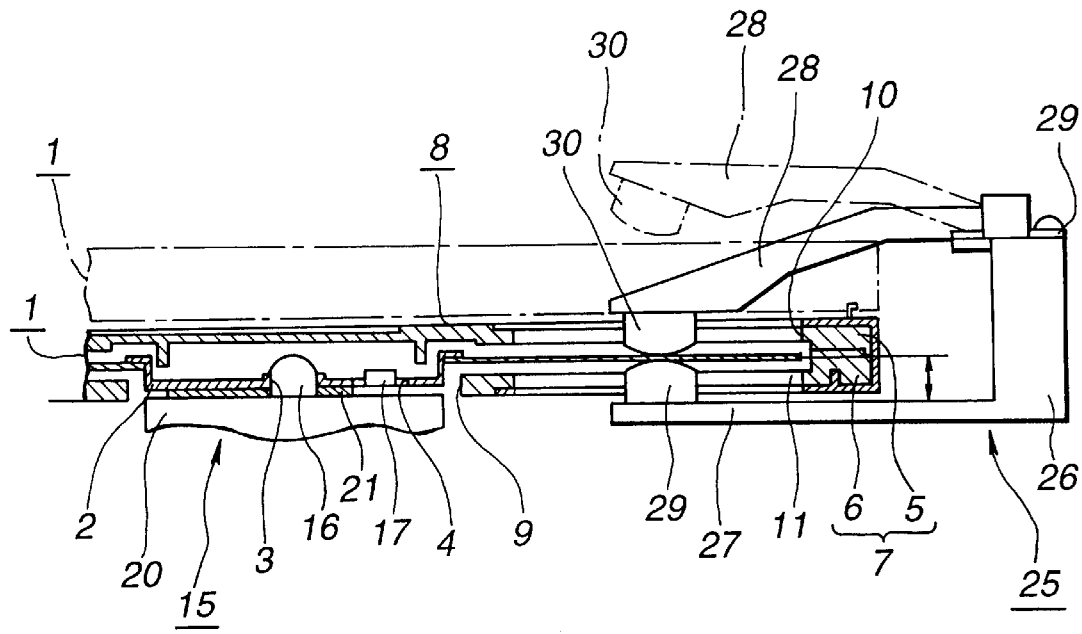
FIG. 1 is a schematic longitudinal cross-sectional view showing the state in which a disc cartridge is loaded on a conventional magnetic disc apparatus for recording/reproducing information signals.
Figure 2:
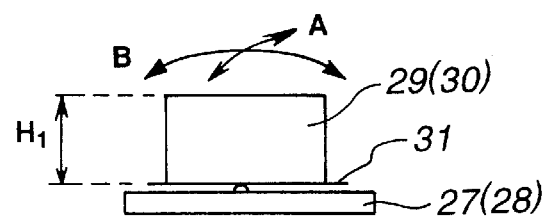
FIG. 2 is a side view showing the state of mounting the magnetic head of the magnetic head apparatus provided in a conventional magnetic disc apparatus.

Referring to the drawings, preferred embodiments of the present invention will be explained in detail.

The magnetic disc apparatus according to the present invention can record and/or reproduce information signals selectively using a first disc cartridge holding a first magnetic disc for recording information signals at a first recording density or a second disc cartridge for recording information signals at a second recording density higher than the first recording density.

Before proceeding to description of the magnetic disc apparatus according to the present invention, the first and second disc cartridges used in the present magnetic disc apparatus are explained. The magnetic discs held in these disc cartridges are of a diameter equal to 3.5-inch.

Figure 3:
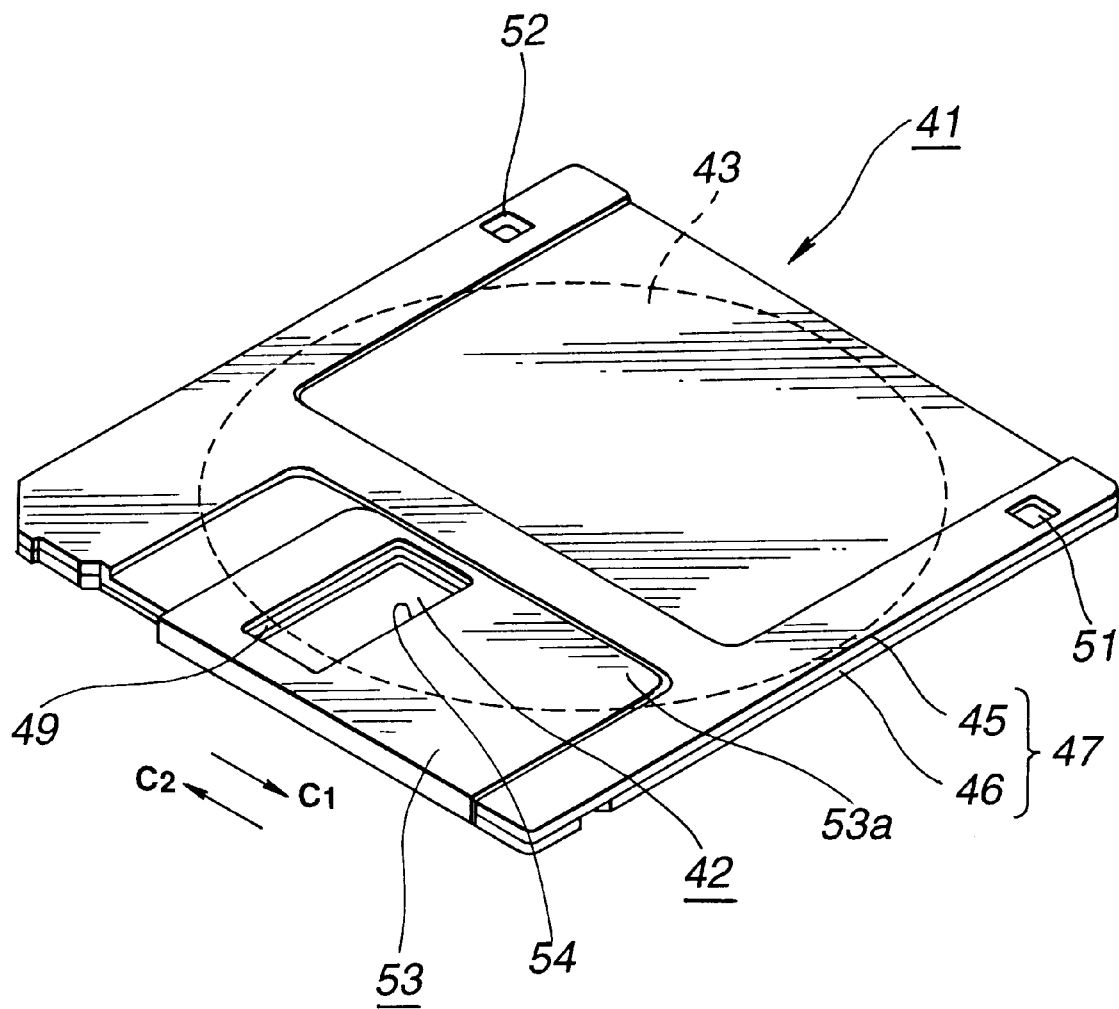
FIG. 3 is a perspective view showing a first disc cartridge holding a first magnetic disc of a first recording density.
Figure 4:
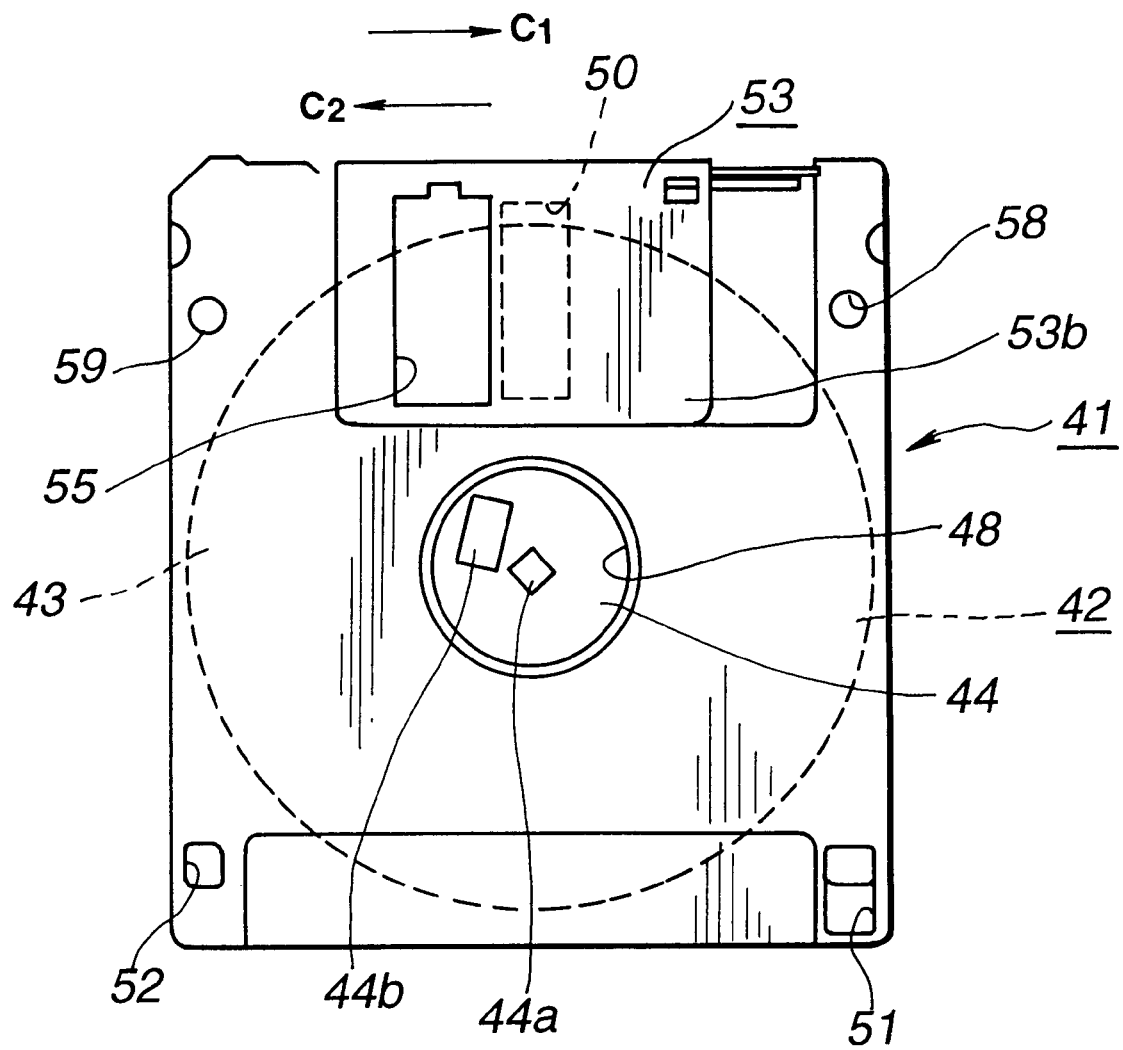
FIG. 4 is a bottom view showing the lower surface side of the first disc cartridge.

The first disc cartridge 41 holds a first magnetic disc 42 having a recording capacity not larger than 2 megabyte and on which information signals are recorded at a first recording density, as shown in FIGS. 3 and 4. The first magnetic disc 42 housed in the first disc cartridge 41 has a disc substrate 43 of flexible synthetic resin. On both major surfaces of the disc substrate 43 are deposited magnetic layers to form signal w recording portions. In the center of the disc substrate 43 is formed a circular center opening which is stopped up by a hub 44. This hub 44, mounted on the disc substrate 43, is formed of a magnetic material, such as stainless steel or iron, and has a tubular projection fitted in the center opening. The hub has a flange on the outer rim side of the projection bonded to the rim of the center opening. In a mid portion of the hub 44 is formed a rectangular spindle opening 44a passed through by a spindle of the disc rotation driving unit provided on the magnetic disc apparatus. At a position offset from the center of the hub is formed a rectangular driving pin engagement hole 44b engaged by a driving pin provided on the disc rotation driving unit.

The first magnetic disc 42, constituted as described above, is rotatably housed within a main cartridge body unit 47 formed by abutting and combining upper and lower cartridge halves 45, 46. At a mid portion on the lower surface of the main cartridge body unit 47 housing the magnetic disc 42 is formed a circular center opening 48 in which is intruded a disc table of the disc rotation driving unit, as shown in FIG. 4. In opposite positions on the upper and lower sides of the main cartridge body unit 47 are formed rectangular recording and/or reproducing apertures 49, 50, as shown in FIGS. 3 and 4. These apertures 49, 50 are formed at a center position in the left-and-right direction of the main cartridge body unit 47 for extending from the vicinity of the center opening 48 to the front side of the main cartridge body unit 47. The first magnetic disc 42, housed in the main cartridge body unit 47, has its signal recording portion partially exposed to outside across the inner and outer rims of the disc via recording and/or reproducing apertures 49, 50. At a corner on the backside surface of the main cartridge body unit 47 is formed a mistaken recording inhibiting hole 51 for inhibiting superposed recording of information signals on the housed magnetic disc 42. At the opposite side corner with respect to the mistaken recording inhibiting hole 51 in the lower surface of the main cartridge body unit 47 is formed a disc discrimination hole 52 specifying the sort of the magnetic disc housed in the main cartridge body unit 47, as shown in FIG. 4. By detecting the disc discrimination hole 52, it is discriminated that the magnetic disc housed in the main cartridge body unit 47 has a recording capacity of 2 megabyte.

Figure 5:
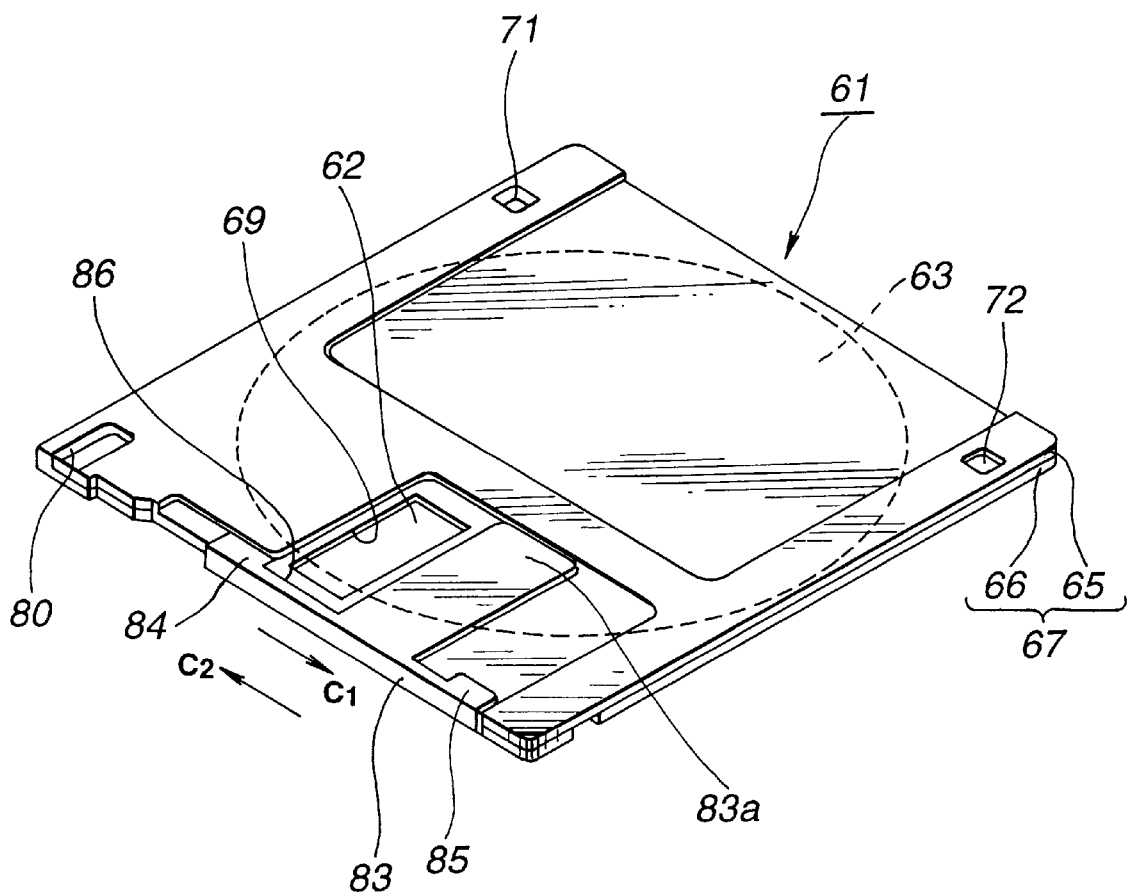
FIG. 5 is a perspective view showing a second disc cartridge holding a second magnetic disc of a second recording density.

In the lower surface of the main cartridge body unit 47 are formed positioning pin engagement holes 58, 59 for positioning the loading position of the disc cartridge 41 on the magnetic disc apparatus. These positioning pin engagement holes 58, 59 are provided on both sides of the recording and/or reproducing apertures 49, 50, as shown in FIG. 5.

On the first disc cartridge 41 is mounted a shutter member 53 adapted for opening/closing the recording and/or reproducing apertures 49, 50, as shown in FIGS. 3 and 4. The shutter member 53 is formed to a U-shaped cross-section by using a plate of metal, such as aluminum or stainless steel, or on molding a synthetic resin, and is fitted from the front side of the main cartridge body unit 47 for overlying the recording and/or reproducing apertures 49, 50 and for being moved in the direction indicated by arrows C1 or C2 in FIGS. 3 and 4. The shutter member 53 includes shutter portions 53a, 53b extending over the upper and lower sides of the main cartridge body unit 47 for overlying the recording and/or reproducing apertures 49, 50. These shutter portions 53a, 53b are formed with rectangular cut-outs 54, 55, in association with the apertures 49, 50, adapted for opening the apertures 49, 50 when the shutter member 53 is moved in the direction indicated by arrow C1 in FIGS. 3 and 4 to a position of opening the apertures 49, 50.

Meanwhile, the shutter member 53 is biased by a spring member, not shown, provided in the main cartridge body unit 47, in a direction in which the shutter portions 53a, 53a close the recording and/or reproducing apertures 49, 50, as indicated by arrow C2 in FIGS. 3 and 4.

A second disc cartridge 61, holding a second magnetic disc 62, adapted for recording information signals to a second recording density higher than that of the first magnetic disc 42, has the size and thickness in common with the first disc cartridge 41.

Similarly to the above-mentioned first magnetic disc 42, the second magnetic disc 62, housed in the second disc cartridge 61, has a disc substrate 63 of flexible synthetic resin, on both major surfaces of which are deposited magnetic layers to form signal recording portions. In the center of the disc substrate 63 is formed a circular center opening and a hub 64 is mounted thereon for closing the center opening. This hub 64, mounted on the disc substrate 63, is formed of a magnetic material, such as stainless steel or iron, and has a tubular projection fitted in the center opening. The hub has a flange on the outer rim side of the projection bonded to the rim of the center opening. In a mid portion of the hub 64 is formed a rectangular spindle opening 64a passed through by a spindle of the disc rotation driving unit provided on the magnetic disc apparatus. At a position offset from the center of the hub is formed a rectangular driving pin engagement hole 64b engaged by a driving pin provided on the disc rotation driving unit.

Figure 6:
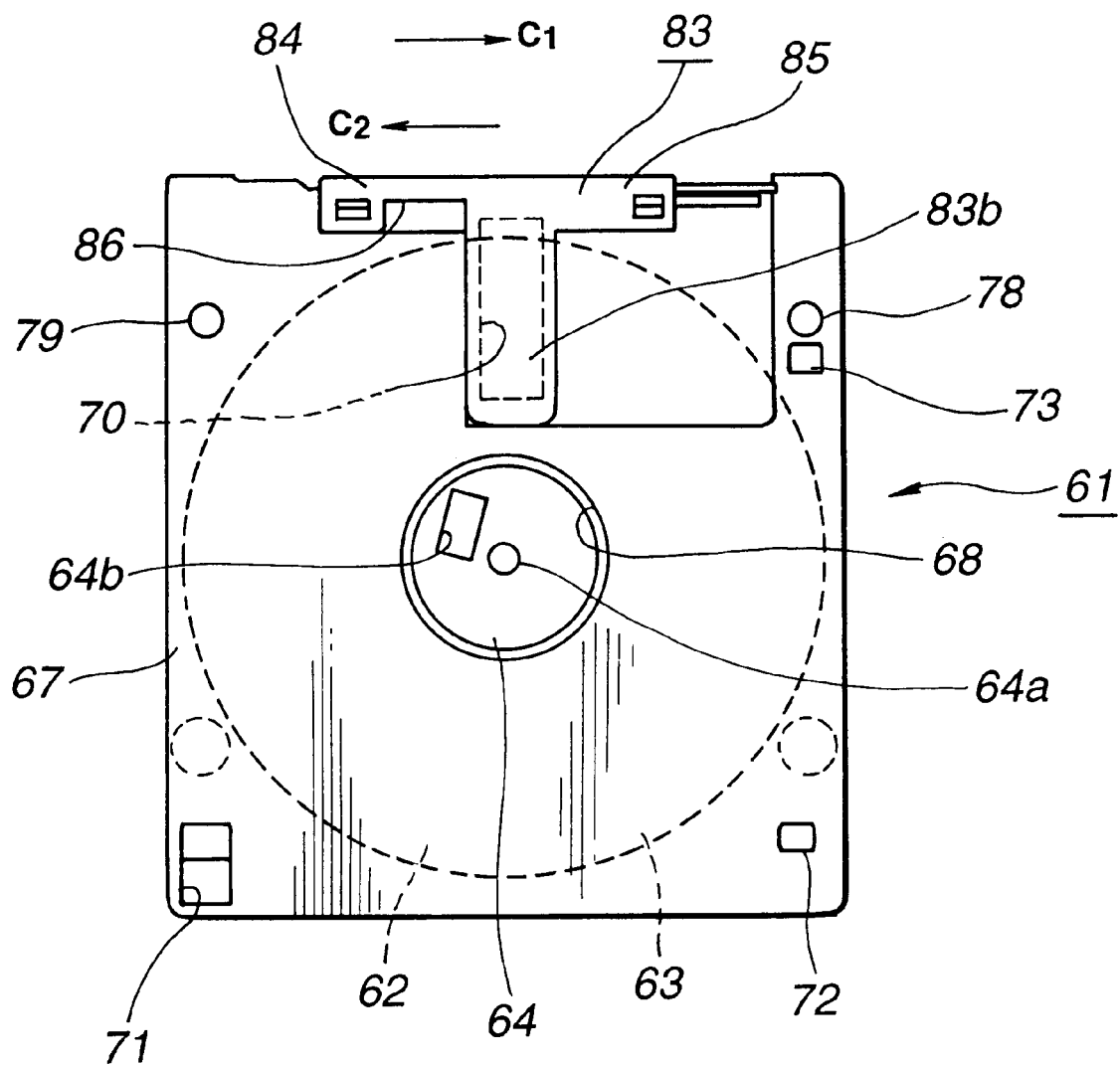
FIG. 6 is a bottom view showing the lower surface side of the second disc cartridge.

The above-described second magnetic disc 62 has a recording capacity of not less than 100 megabyte, preferably not less than 200 megabyte. The second magnetic disc 62 is rotatably housed in the main cartridge body unit 67 formed by abutting and combining upper and lower cartridge halves 65, 66. At a mid portion on the lower surface of the main cartridge body unit 67 housing the second magnetic disc 62 is formed a circular center opening 68 in which is intruded a disc table of the disc rotation driving unit, as shown in FIGS. 5 and 6. In opposite positions on the upper and lower sides of the main cartridge body unit 67 are formed rectangular recording and/or reproducing apertures 69, 70, as shown in FIGS. 5 and 6. These apertures 69, 70 are formed at a center position in the left-and-right direction of the main cartridge body unit 67 for extending from the vicinity of the center opening 68 to the front side of the main cartridge body unit 67. The second magnetic disc 62, housed in the main cartridge body unit 67, has its signal recording portion partially exposed to outside across the inner and outer rims of the disc via recording and/or reproducing apertures 69, 70.

The second magnetic disc 62 has the signal recording portion up to the vicinity of the outer rim for realizing the high recording capacity. The recording and/or reproducing apertures 69, 70 are larger in size than the recording and/or reproducing apertures 49, 50 formed in the above-mentioned first disc cartridge 41 so that the signal recording portion formed up to the vicinity of the magnetic disc 62 is exposed to outside the main cartridge body unit 67 so as to be accessed by the magnetic head of the magnetic disc apparatus. That is, the recording and/or reproducing apertures 69, 70, provided in the second disc cartridge 61, are formed up to the vicinity of the front side of the main cartridge body unit 67.

On the opposite side corner on the backside surface of the main cartridge body unit 67 is formed a mistaken recording inhibiting hole 71 for inhibiting superposed recording of information signals on the second magnetic disc 62 housed therein, as shown in FIGS. 5 and 6. The mistaken recording inhibiting hole 71 is provided at an opposite side corner to that of the first disc cartridge 41. In the lower surface of the main cartridge body unit 67 at a corner on the opposite side to the side thereof having the mistaken recording inhibiting hole 71 is formed a detection hole 72, as shown in FIG. 6. This detection hole 72 is provided at a position in register with the mistaken recording inhibiting hole 51 of the first disc cartridge 41, such that, if a magnetic disc apparatus employing only the first disc cartridge 41 is loaded on the magnetic disc apparatus, the detection hole 72 is detected by the mistaken recording detection mechanism provided on the magnetic disc apparatus for inhibiting recording of information signals on the second magnetic disc 62 to prevent inadvertent erasure of the information signals recorded to high recording density on the second magnetic disc 62.

In the lower surface of the main cartridge body unit 67 are formed positioning pin engagement holes 78, 79 for positioning pins provided on the magnetic disc apparatus for setting the loading position, as shown in FIG. 6. These positioning pin engagement holes 78, 79 are formed on both sides of the recording and/or reproducing apertures 69, 70, as shown in FIG. 6. In the lower surface of the main cartridge body unit 67 is formed a disc discrimination hole 72 in the vicinity of the positioning pin engagement hole 78 for indicating that the second magnetic disc 62 having a high recording capacity of, for example, 200 megabyte, has been housed in the main cartridge body unit 67.

In the upper surface of the main cartridge body unit 67 at a corner on the front side thereof provided with the recording and/or reproducing apertures 69, 70, there is formed a mistaken recording inhibiting groove 80 for restricting the inserting direction into the magnetic disc apparatus.

Similarly to the first disc cartridge 41, the second disc cartridge 61 is also provided with a shutter member 83 adapted for opening/closing the recording and/or reproducing apertures 69, 70. This shutter member 83 is similarly formed using a plate of metal, such as aluminum or stainless steel, or on molding synthetic resin.

The shutter member 83, provided on the second disc cartridge 61, has shutter portions 83a, 83b sized to be sufficient to close the recording and/or reproducing apertures 69, 70, and shutter supporting portions 84, 85 protuberantly formed on both sides of the proximal ends of the shutter portions 83a, 83b to present an overall T-shaped cross-section. The shutter supporting portions 84, 85, interconnecting the shutter portions 83a, 83b, serve for supporting the shutter member 83 by the main cartridge body unit 67.

The recording and/or reproducing apertures 69, 70 provided in the second disc cartridge 61 are formed up to the vicinity of the main cartridge body unit 67, for exposing the signal recording portion formed up to the vicinity of the outer rim of the second magnetic disc 62, and are sized to be larger than the recording and/or reproducing apertures 49, 50 provided in the first disc cartridge 41. For positively opening the recording and/or reproducing apertures 69, 70, thus increased in size, the shutter supporting portion 84 of the shutter member 83 is formed with a cut-out recess 86 for opening the sides of the apertures 69, 70 opened on the front side when the shutter member 83 is moved to the position of opening the apertures 69, 70, as shown in FIG. 5. That is, the portion of the shutter supporting portion 84 extended over the upper and lower sides of the main cartridge body unit 67 is formed with the cut-out recess 86.

The above-described shutter member 83 is fitted from the front side of the main cartridge body unit 67 for overlying the recording and/or reproducing apertures 69, 70, and is mounted for movement in the direction indicated by arrows C1 and C2 in FIGS. 4 and 6 in which the apertures 69, 70 are opened or closed by the shutter portions 83a, 83b.

The shutter member 83 is biased by a spring member, not shown, provided in the main cartridge body unit 67, in a direction of closing the recording and/or reproducing apertures 69, 70 as indicated by arrow C2 in FIGS. 5 and 6.

Then, reference is had to the drawings for illustrating a magnetic disc apparatus according to the present invention in which information signals can be recorded and/or reproduced selectively using the first disc cartridge 41 housing the first magnetic disc 42 recording the information signals at the first recording density or the second disc cartridge 61 housing the second magnetic disc 62 recording the information signals at the second recording density higher than the first recording density.

Figure 7:
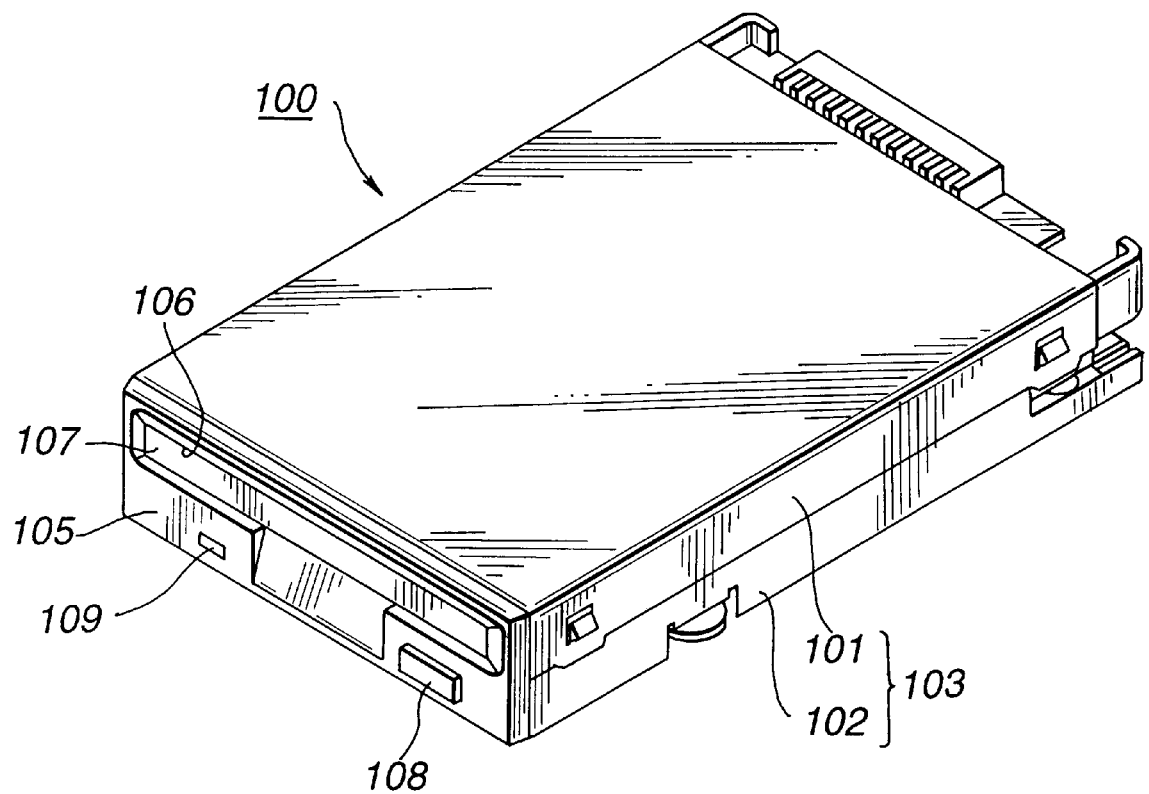
FIG. 7 is a perspective view showing the appearance of a magnetic disc apparatus according to the present invention.
Figure 8:
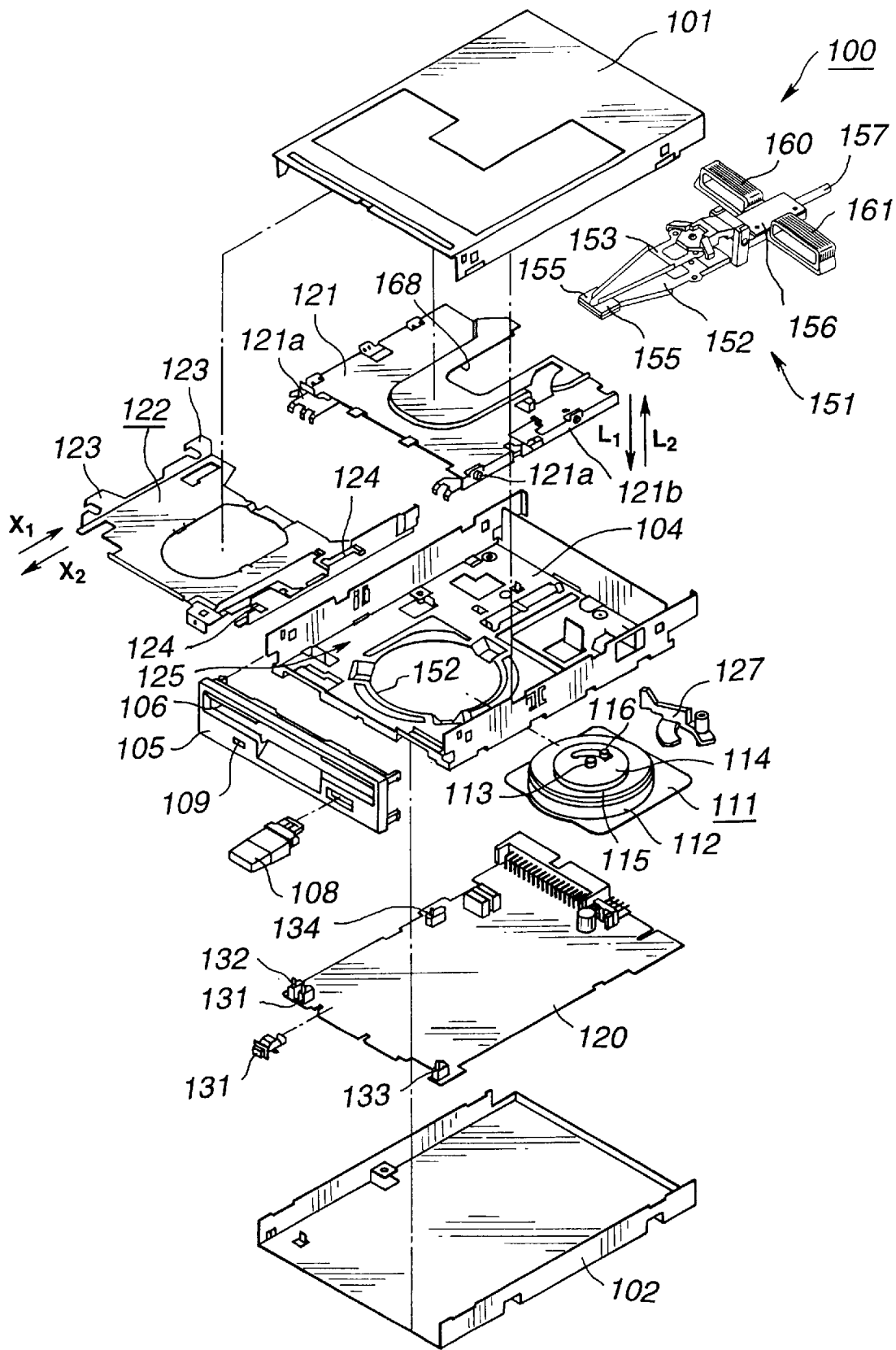
FIG. 8 is an exploded perspective view showing a magnetic disc apparatus according to the present invention.

A magnetic disc apparatus 100 according to the present invention has a main body unit 103 which is constituted by abutting paired upper and lower covers 101, 102 formed by warping a thin metal sheet to a U-shaped cross-section, as shown in FIGS. 7 and 8. Within this main body unit 103 is housed a base block 104 formed of, for example, synthetic resin. In the upper edge of a front panel 105 is formed a cartridge insertion/ejection opening 106 sized to be sufficient to permit the first or second disc cartridge 41 or 61 to be inserted into the inside of the main body unit 103 in the horizontal direction with the front side of the disc cartridge carrying the shutter member 53, 83 as inserting end. When the disc cartridge 41 or 61 is not as yet loaded in the main body unit 103, the cartridge insertion/ejection opening 106 is closed by an opening/closure cover 107 rotated towards the inside of the main body unit 103 when the disc cartridge 41 or 61 is not loaded in position in the main body unit 103.

On the front side on the lower edge of the front panel 104 are mounted an ejection button 108 for operating an ejection mechanism for ejecting the first or second disc cartridge 41, 61 loaded in the main body unit 103 from the main body unit 103 and a light emission display unit 109 for displaying the operating state of the magnetic disc apparatus.

Figure 9:
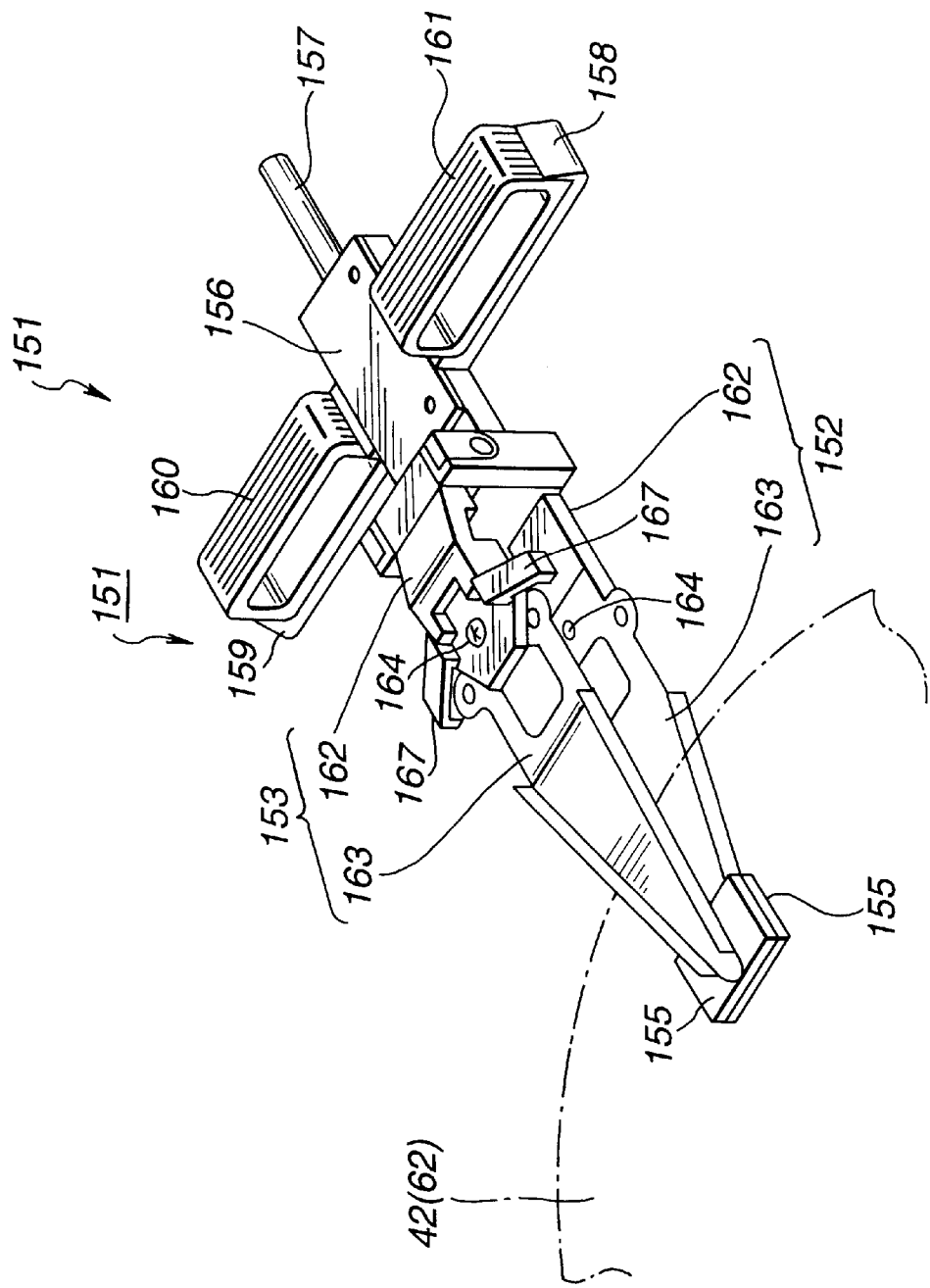
FIG. 9 is a perspective view showing a magnetic head apparatus used in a magnetic disc apparatus according to the present invention.

On the base block 104 provided in the main body unit 103 is arranged a disc rotation driving unit 111 for rotationally driving the first or second magnetic disc 42, 62 housed in the first or second disc cartridge 41, 61 loaded in the main body unit 103. This disc rotation driving unit 111 includes a spindle motor 112 mounted on the base block 104, and a disc table 114 mounted on the distal end of a spindle 113 of the spindle motor 112 for rotation in unison therewith, as shown in FIG. 9. On the surface of the disc table 114 carrying the first or second magnetic disc 42, 62 is mounted a magnet 115 for sucking the hub 44 or 64 carrying the magnetic disc 42 or 62. On the setting surface of the disc table 114 for the magnetic disc 42 or 62, there is set upright a driving pin 116 at a position offset from the spindle 113 for being engaged in the driving pin engagement hole 44b provided in the hub 44 or in the driving pin engagement hole 64b, respectively. The driving pin 116 is biased towards the outer rim of the disc table 110 by a biasing member, such as a tension spring, not shown.

On the lower surface of the base block 104 is mounted an electronic circuit board 120 on which are arranged a variety of electronic circuits or detection switches.

On the upper surface of the base block 104 provided with the disc table 114 are arranged a cartridge holder 121 constituting a cartridge holding member holding the first or second disc cartridge 41 or 61 inserted into the main body unit 103 via the cartridge insertion/ejection opening 106. This cartridge holder 121 has, on its both sides, cartridge holders 121a, 121b for holding both sides of the first or second disc cartridge 41 or 61 so that the cartridge holder 121 is formed as a thin casing opened on the front and lower sides.

This cartridge holder 121 holds the first or second disc cartridge 41 or 61 inserted into the main body unit 103 via the cartridge insertion/ejection opening 106 and is moved by a cartridge loading mechanism built into the base block 104 in the up-and-down direction between a position spaced apart from the disc table 114 of the disc rotation unit 111 to a position proximate to the disc table 114 for loading the first or second magnetic disc 42 or 62 held in the first or second disc cartridge 41 or 61 held by the cartridge holder 121 on the disc table 114 or unloading the first or second magnetic disc 42 or 62 loaded on the disc table 114.

On the upper surface of the base block 104 is arranged an uplifting/lowering plate 122 constituting the cartridge loading mechanism for uplifting or lowering the cartridge holder 121 towards or away from the disc rotation unit 111 arranged on the base block 104. On both sides of the base block facing the uplifting/lowering plate 122 are set upright cam pieces 123, 124 having inclined surfaces, as shown in FIG. 8. On these cam pieces 123, 124 are set supporting pins 124 protuberantly formed on both sides of the cartridge holder 121. The uplifting/lowering plate 122 is biased by a biasing member, not shown, in the direction indicated by arrow X2 in FIG. 8. On the rear side on the base block 103 is mounted a lock lever 127 adapted for locking the uplifting/lowering plate 122 at the rearward position when the uplifting/lowering plate 122 has been moved to the rear side in the direction indicated by arrow X1 in FIG. 8.

On the rear side on the base block 104 is mounted an ejection motor for moving the uplifting/lowering plate 122 in the direction indicated by arrow X1 in FIG. 8 against the bias of the biasing member.

The uplifting/lowering plate 122 is moved by the ejection motor in the direction indicated by arrow X1 in FIG. 8 to the position rearwardly of the base block 104 when the first or second disc cartridge 41 or 61 is enabled to be inserted via the cartridge insertion/ejection opening 106 into the main body unit 103. At this time, the uplifting/lowering plate 122 is locked by a lock lever 127 and is held at the position rearwardly of the base block 104. When the uplifting/lowering plate 122 is locked by the lock lever 127, the cartridge holder 121 has a supporting pin 124 supported by the upper surfaces of the cam pieces 123, 124 of the uplifting/lowering plate 122 and is held at the uplifted position spaced apart from the disc table 114 of the disc rotation unit 111. When held at the uplifted position, the cartridge holder 121 has its forward side opened end facing the cartridge insertion/ejection opening 106. If the first or second disc cartridge 41 or 61 is inserted via cartridge insertion/ejection opening 106 into the inside of the cartridge holder 121, the lock lever 127 is rotated by the first or second disc cartridge 41 or 61. When the first or second disc cartridge 41 or 61 is inserted up to the cartridge inserting position within the cartridge holder 121, the locked state of the uplifting/lowering plate 122 by the lock lever 127 is removed. If the locked state by the lock lever 127 is removed, the uplifting/lowering plate 122 is moved in the direction indicated by arrow X2 in FIG. 8 under the bias of the biasing member. If the uplifting/lowering plate 122 is moved in the direction indicated by arrow X2 in FIG. 8, the supporting pin 124 is moved along the inclined surfaces of the cam pieces 122, 123, such that the cartridge holder 121 is lowered to the disc table 114 in the direction indicated by arrow L1 in FIG. 8. This positions the first or second disc cartridge 41 or 61 held by the cartridge holder 121 on the cartridge loading unit 125 provided on the base block 104, while loading the first or second magnetic disc 42 or 62 held in the first or second disc cartridge 41 or 61 on the disc table 114. At this time, the first or second magnetic disc 42 or 62 is set on the disc table 114, by the spindle 113 traversing the spindle opening 44*a* or 64*a* provided in the hub 44 or 64, respectively, by the driving pin 116 traversing the driving pin engagement hole 44*b* or the driving pin engagement hole 64*b* and by the hub 44 or 64 being sucked by the magnet 115, such that the first or second magnetic disc 42 or 62 is enabled to be rotated in unison with the disc table 114.

As the spindle motor 112 is run in rotation, the first or second magnetic disc 42 or 62 is run in unison with the disc table 114.

Since the first magnetic disc 42 is run in rotation in unison with the disc table 114, the driving pin 116 compresses against the outer peripheral side of the driving pin engagement hole 44*b* to compress the corner of the rectangular spindle opening 44*a* against the peripheral surface of the spindle 113 to achieve centering in which the center of rotation of the first magnetic disc 42 coincides with that of the spindle 113.

The cartridge loading unit 125 includes positioning pins engaged in positioning pin engagement holes 58, 59 or 78, 79 provided in the first or second disc cartridge 41 or 61. These positioning pins are engaged in the positioning pin engagement holes 58, 59 or 78, 79 for positioning the first or second disc cartridge 41 or 61 loaded on the cartridge loading unit 125 in the horizontal and height-wise directions.

When the first or second magnetic disc 42 or 62 is loaded on the disc table 114, the first or second disc cartridge 41 or 61 is loaded on the cartridge loading unit as it is positioned in both the horizontal and height-wise directions, the first or second magnetic disc 42 or 62 is positioned at an approximately intermediate position between the upper and lower sides of the main cartridge body units 47, 67 and is run in rotation in a manner free of contact with the upper and lower inner surfaces of the main cartridge body units 47, 67.

When the first or second magnetic disc 42 or 62 is loaded on the disc table 114, the first or second disc cartridge 41 or 61 is loaded on the cartridge loading unit as it is positioned by the positioning pins in both the horizontal and height-wise directions. Thus, the first or second magnetic disc 42 or 62 is positioned at an approximately intermediate position between the upper and lower sides of the main cartridge body units 47, 67 and is run in rotation in a manner free of contact with the upper and lower inner surfaces of the main cartridge body unit 47 or 67.

On insertion into the cartridge holder 121 of the first or second disc cartridge 41 or 61, the shutter member 53 or 83, provided on the first or second disc cartridge 41 or 61, respectively, is moved by the shutter member opening/closing mechanism provided on the cartridge holder 121 in the direction of opening the recording and/or reproducing apertures 49, 50 or 69, 70 for opening these apertures.

For ejecting the first or second disc cartridge 41 or 61 loaded on the cartridge loading unit 125 from the main body unit 103, such as to load the first or second magnetic disc 42 or 62 on the disc table 114, the ejection button 108 provided on the front panel 104 is actuated. On actuation of the ejection button 108, the ejection motor is run in rotation so that the uplifting/lowering plate 122 is moved in the direction indicated by arrow X1 in FIG. 8 against the bias of the biasing member. If the uplifting/lowering plate 122 is moved in the direction indicated by arrow X1 in FIG. 8, the supporting pin 124 is moved along the inclined surfaces of the cam pieces 122, 123, so that the cartridge holder 121 is uplifted in the direction indicated by arrow L2 in FIG. 8 away from the base block 104 to uplift the first or second disc cartridge 41 or 61 away from the cartridge loading unit 125 provided on the base block 104 to unload the first or second magnetic disc 42 or 62 from the disc table 114.

If the cartridge holder 121 is moved to the uplifted position away from the base block 104, the lock lever 127 is turned to thrust the first or second disc cartridge 41 or 61 held by the cartridge holder 121 in a direction of expulsion from the cartridge holder 121 so that the first or second disc cartridge 41 or 61 is partially expelled from the cartridge holder 121. When turned for thrusting the first or second disc cartridge 41 or 61 in a direction of expelling the first or second disc cartridge 41 or 61 from the cartridge holder 121, the lock lever 127 is engaged with the uplifting/lowering plate 122 to hold the uplifting/lowering plate 122 at the ejected position in which it is moved in the direction indicated by arrow X1 in FIG. 8 against the bias of the biasing member.

On the electronic circuit board 120 arranged on the lower surface of the base block 104 arranged in turn on the main body unit 103, there are provided a disc-in detection switch 131 and first and second mistaken recording inhibition detection switches 132, 133, in a manner of projecting an operator, not shown, on the upper surface of the base block 104. The disc-in detection switch 131 detects the possible presence of the first or second disc cartridge 41 or 61, loaded in position, while the first and second mistaken recording inhibition detection switches 132, 133 detect the possible opening of the mistaken recording inhibiting hole 51 or 71 provided in the first or second disc cartridge 41 or 61, respectively. On the electronic circuit board 120 is mounted a disc capacity discriminating switch 134 for detecting a disc capacity discriminating hole provided in the second disc cartridge 61, as shown in FIG. 8. This disc capacity discriminating switch 134 is provided in register with the disc discrimination hole 72 formed in the second disc cartridge 61 loaded on the cartridge loading unit 125 and detects the possible presence of the disc discrimination hole in the disc cartridge loaded on the cartridge loading unit 125 for detecting the capacity of the magnetic disc housed in the disc cartridge.

On the base block 104 is arranged a magnetic head apparatus 151 for having access to the signal recording portions formed on both major surfaces of the first or second magnetic disc 42 or 62 run in rotation in unison with the disc table 114 in order to record and/or reproduce information signals. The magnetic head apparatus 151 is positioned inwardly of the main body unit 103 for facing the first or second disc cartridge 41 or 61 inserted into the main body unit 103, as shown in FIG. 8.

The magnetic head apparatus 151 includes first and second head supporting arms 152, 153 extended towards both major surfaces, formed with the signal recording portions, of the first or second magnetic disc 42 or 62 loaded on the disc table 114, as shown in FIG. 8. The distal ends of these head supporting arms 152, 153 carry magnetic heads 155, 155 adapted for accessing the signal recording portions formed on both major surfaces of the first and second magnetic disc 42, 62.

Turning more specifically to the magnetic head apparatus 151 according to the present invention, this magnetic head 151 includes a main head carriage unit 156 to which is connected the first and second head supporting arms 152, 153 carrying the magnetic heads 155, 155, and which is adapted for being moved radially of the first or second magnetic disc 42 or 62 loaded on the disc table 114 as-one with these first and second head supporting arms 152, 153.

The main head carriage unit 156 is formed of a rigid material, such as synthetic resin or aluminum or magnesium alloys. The main head carriage unit 156 is supported by a main guide shaft 157 and a subsidiary guide shaft, not shown, which are mounted on the base block 104 parallel to the radial direction of the first or second magnetic disc 42 or 62 loaded on the disc table 114. On both sides of the proximal end of the main head carriage unit 156 are projected a pair of coil supporting pieces 158, 159 by which are mounted driving coils 160, 161 inserted in a yoke of a voice coil motor, not shown, provided on the base block 104. As the driving current is supplied to the driving coils 160, 161 of the main head carriage unit 156, the latter is moved radially of the first or second magnetic disc 42 or 62 loaded on the disc table 114.

The first and second head supporting arms 152, 153, connected to the main head carriage unit 156, are each made up of a connecting plate 162, operating as a connecting portion to the main head carriage unit 156, and a head supporting spring 163 mounted on the distal end of the connecting plate 162. The connecting plate 162 is formed of a rigid material, such as synthetic resin or aluminum or magnesium alloys, while the head supporting spring 163 is formed by a spring plate. The head supporting spring 163 is substantially triangular in shape and is tapered towards the distal end which carries the magnetic head 155, as shown in FIG. 9. The head supporting spring 163, carrying the magnetic head 155, has its proximal end secured by a set screw 164 to the distal end of the connecting plate 162.

The connecting plate 162 constituting the first head supporting arm 152 is extended integrally from the lower end of the main head carriage unit 156. That is, the first head supporting arm 152 is extended towards the lower major surface of the first or second magnetic disc 42 or 62 loaded on the disc table 114, as the first head supporting arm 152 is secured to the main head carriage unit 156, as shown in FIG. 11.

Figure 11:
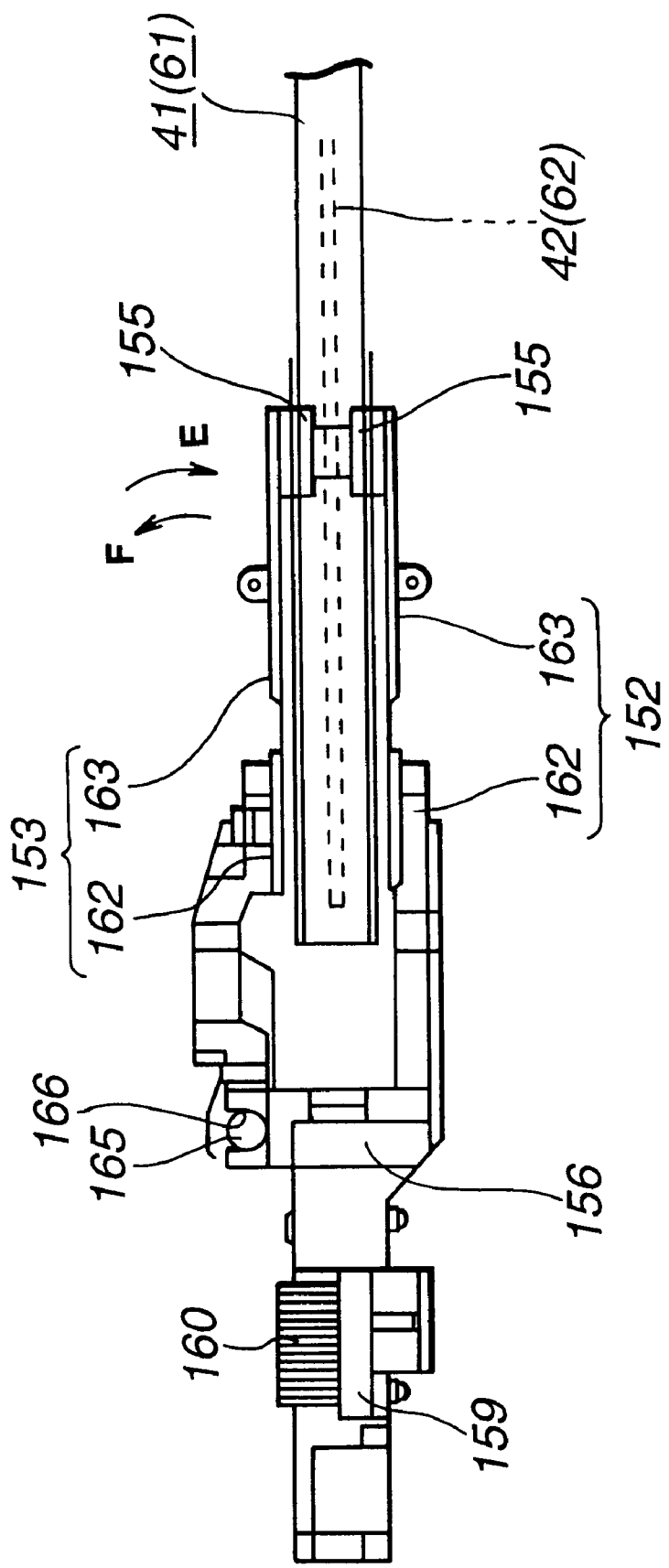
FIG. 11 is a side view of a magnetic head apparatus showing the state in which the first and second head supporting arms carrying the magnetic heads are intruded into the disc cartridge for recording/reproducing information signals.
Figure 12:
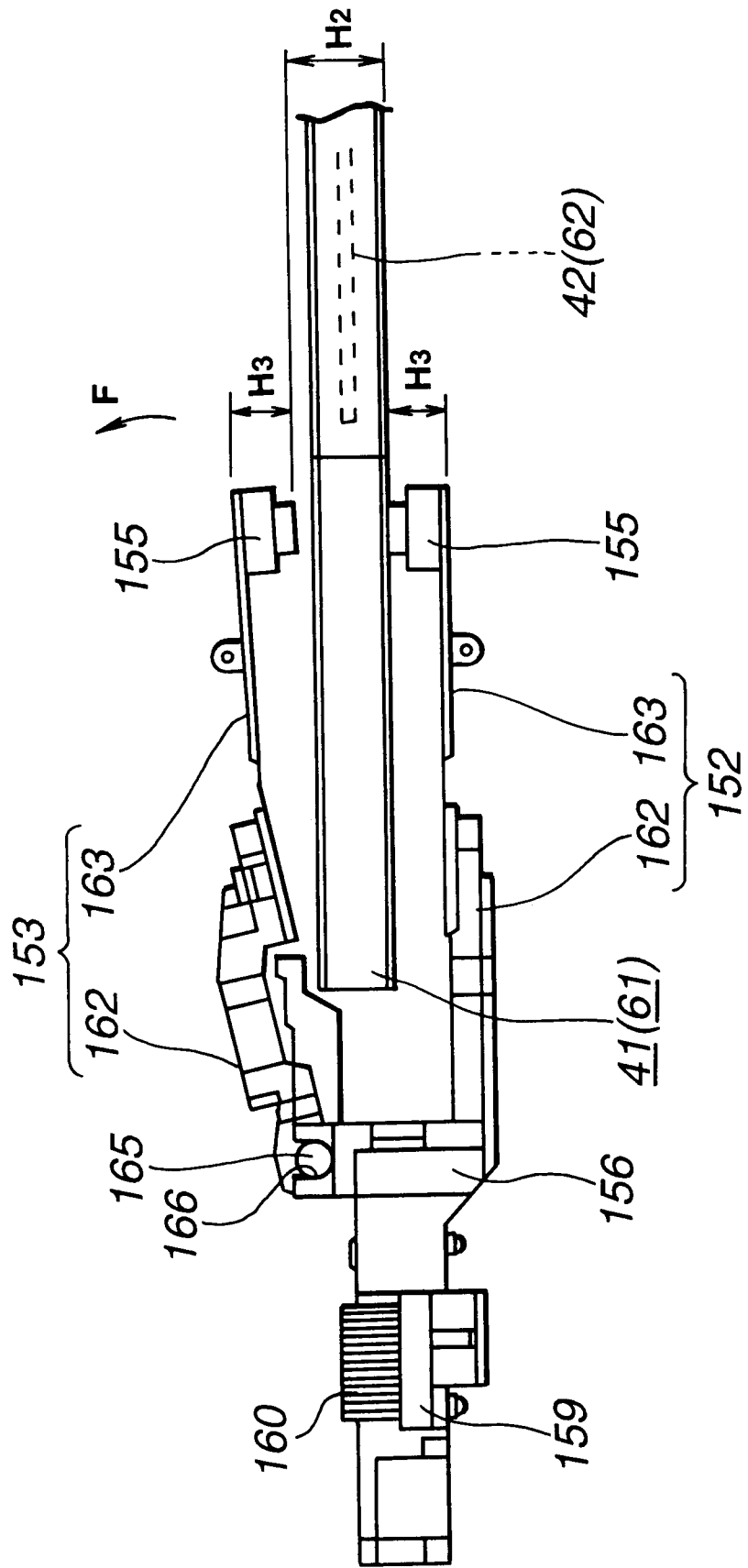
FIG. 12 is a side view showing the state in which the second head supporting arm carrying the magnetic head is rotated in a direction away from the first head supporting arm to eject the disc cartridge.

The second head supporting arm 153 is carried by the main head carriage unit 156 for rotation in the direction indicated by arrows E and F in FIGS. 11 and 12 in which the magnetic head 155 carried on the distal end of the arm 153 is moved towards and away from the magnetic head 155 towards the first head supporting arm 152. Specifically, the second head supporting arm 153 is mounted for rotation in the direction indicated by arrows E and F in FIGS. 11 and 12, about paired supporting shafts 165, 166, protuberantly formed on both sides of the proximal end of the connecting plate 162, as the center of rotation, by having the supporting shafts 165, 166 engaged in shaft engagement grooves 166, 166 formed in the upper end face of the main head carriage unit 156.

The second head supporting arm 153 is run in rotation in the direction indicated by arrows E and F in FIGS. 11 and 12 in an interlocked relation to the uplifting/lowering operation of the cartridge holder 121 with respect to the base block 104. The second head supporting arm 153 is run in rotation in the direction indicated by arrows E and F in FIGS. 11 and 12, in an interlocked relation to the uplifting/lowering of the cartridge holder 121, by having retention pieces 167, 167 protuberantly formed on both sides of the distal end of the connecting plate 162 retained on both sides of a magnetic head apparatus intrusion opening 168 formed in the cartridge holder 121, as shown in FIG. 7.

Figure 10:
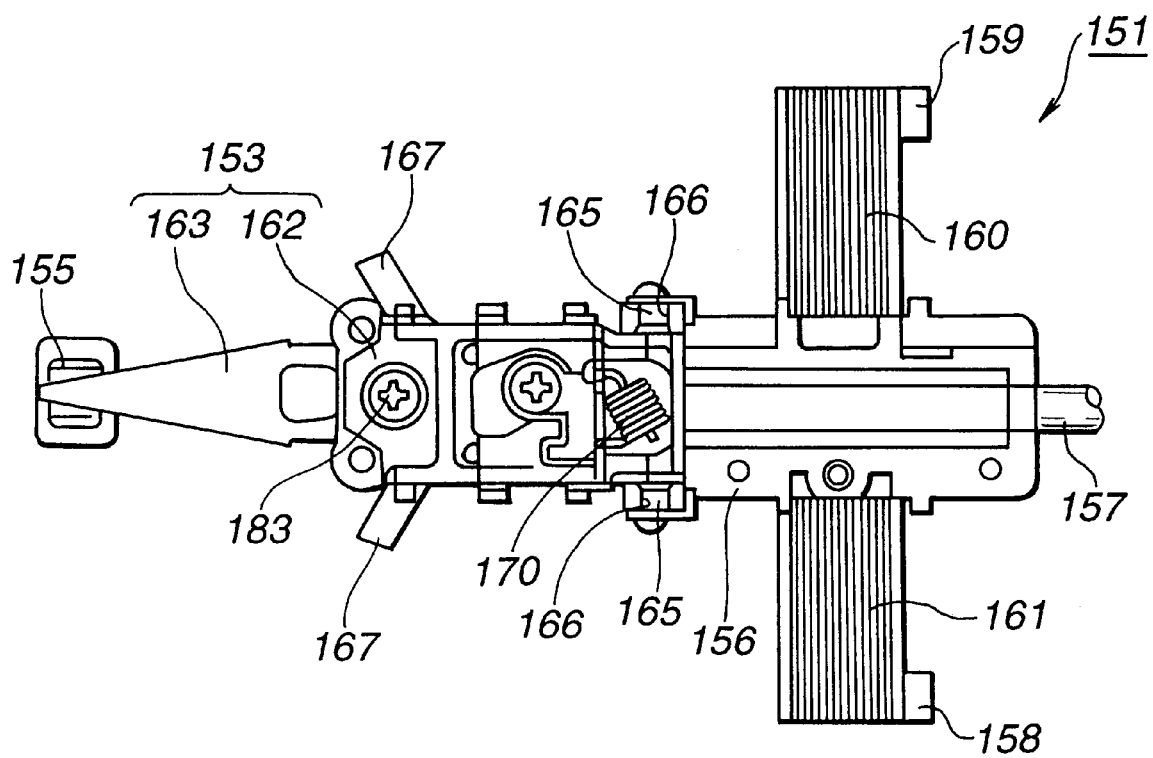
FIG. 10 is a plan view of the magnetic head apparatus.

The second head supporting arm 153 is rotationally biased by a torsion coil spring 170, arranged between the connecting plate 162 and the main head carriage unit 156, in the direction indicated by arrows E and F in FIGS. 11 and 12 in which the distal end side magnetic head 155 approaches the magnetic head 155 towards the first head supporting arm 152, as shown in FIG. 10.

Meanwhile, the torsion coil spring 170, rotationally biasing the supporting shafts 165, 165 engaged in the shaft engagement grooves 166, 166 and the second head supporting arm 153, is supported by a supporting plate 172 mounted by a set screw 171 on the upper end face of the main head carriage unit 156, so as to be prevented from being detached from the main head carriage unit 156, as shown in FIG. 10.

When the cartridge holder 121 is uplifted from the base block 104 as far as the ejection position enabling the insertion or detachment of the first or second disc cartridge 41 or 61, the second head supporting arm 153 is rotated about the supporting shafts 165, 165 in the direction indicated by arrow F in FIG. 12. At this time, there is defined between the second head supporting arm 153 and the first head supporting arm 152 a spacing H2 sufficient to permit the first or second disc cartridge 41 or 61 to be intruded therein without contact with the magnetic head 155, 155 mounted on the distal ends of the first and second head supporting arms 152, 153.

When the first or second disc cartridge 41 or 61 is inserted into the cartridge holder 121, and the cartridge holder 121 is lowered towards the base block 104, the second head supporting arm 153 is rotated in the direction indicated by arrow E in FIG. 12, under the bias of the torsion coil spring 170, about the supporting shafts 165, 165 as the center of rotation, in an interlocked relation to the lowering of the cartridge holder 121. When the second head supporting arm 153 is rotated in the direction indicated by arrow E in FIG. 12, the magnetic head 155 mounted on the distal end of the arm 153 is intruded into the first or second disc cartridge 41 or rid 61 held in the cartridge holder 121 via the opened recording and/or reproducing apertures 49, 50; 69, 70 so as to be contacted with the upper major surface of the first or second magnetic disc 42 or 62 loaded on the disc table 114, as shown in FIG. 11.

More precisely, the magnetic head 155 is slightly floated from the second magnetic disc 63 at a small distance therefrom.

When the cartridge holder 121 is lowered towards the base block 104 so that the first or second disc cartridge 41 or 61 held by the cartridge holder 121 is loaded on the cartridge loading unit 125 provided on the base block 104, the magnetic head 155 mounted on the distal end of the first head supporting arm 152 is intruded into first or second disc cartridge 41 or 61 held on the cartridge holder 121 via the opened recording and/or reproducing apertures 49, 50; 69, 70 so as to be contacted with the lower major surface of the first or second magnetic disc 42 or 62 loaded on the disc table 114.

When the magnetic head 155, 155 mounted on the distal ends of the first and second head supporting arms 152, 153 are contacted with the both major surfaces of the first or second magnetic disc 42 or 62, the first and second head supporting arms 152, 153 are extended on the upper and lower surfaces of the first or second disc cartridge 41 or 61, without being contacted with the first or second disc cartridge 41 or 61 loaded on the cartridge loading unit 125, as shown in FIG. 11. Thus, similarly to the above-described conventional magnetic head, the magnetic heads 155, 155 are of a height H3 sufficient to permit the first and second head supporting arms 152, 153 to be intruded into the main cartridge body units 47, 67 into contact with the both major surfaces of the first or second magnetic disc 42 or 62 run in rotation at an intermediate position between the upper and lower surfaces of the first or second magnetic disc 42 or 62 without being contacted with the first or second disc cartridge 41 or 61.

The magnetic head 155, mounted on the distal ends of the first and second head supporting arms 152, 153, is explained. Since the magnetic heads mounted on the distal ends of the head supporting arms 152, 153 are of the same structure, only one of the head supporting arms is explained.

Figure 13:
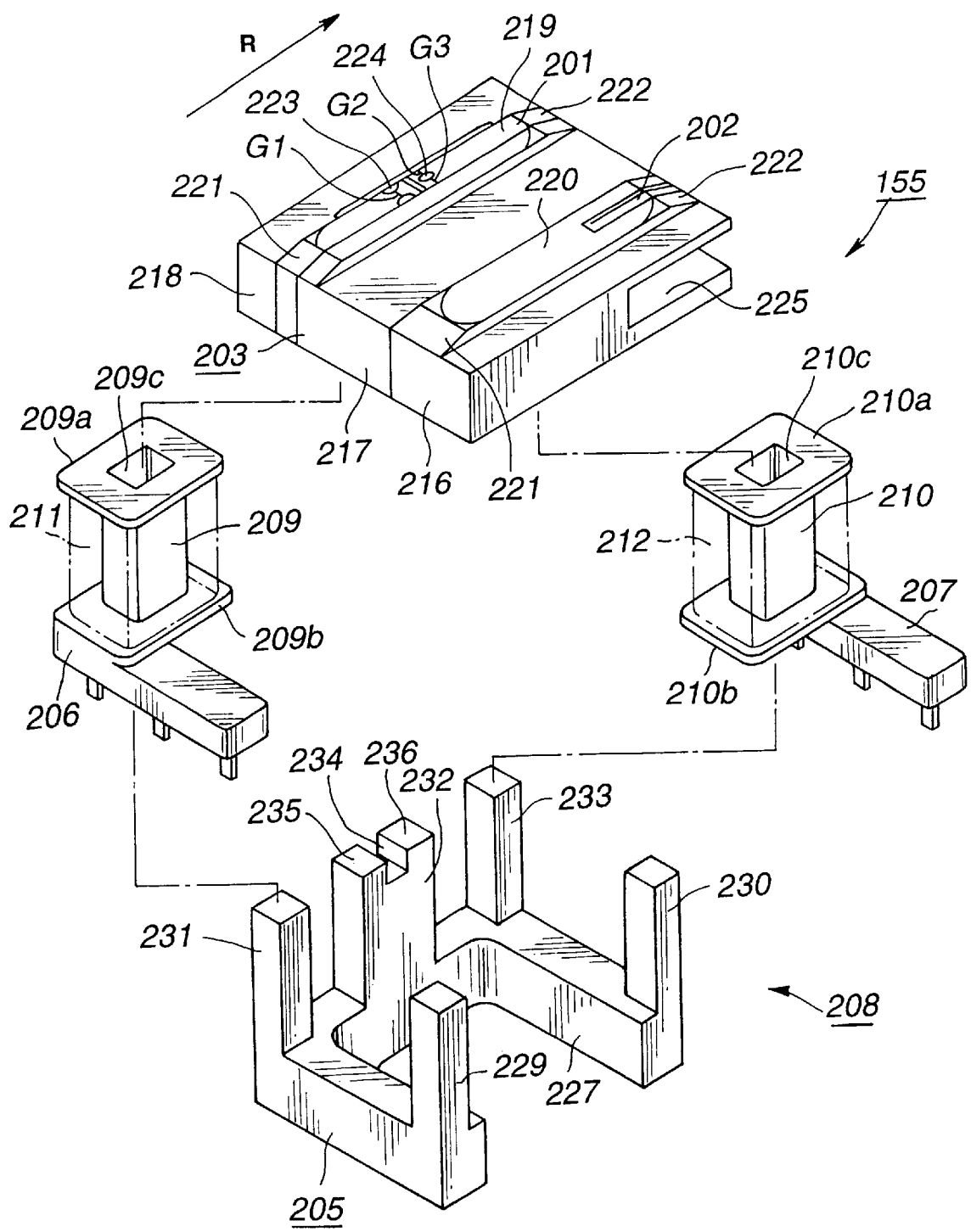
FIG. 13 is an exploded perspective view showing a magnetic head employed in the magnetic disc apparatus according to the present invention.

Referring to FIG. 13, the magnetic head 155 employed in the magnetic disc apparatus according to the present invention includes a head slider 203, into which are built a first head chip 201 and a second head chip 202. The first head chip 201 is used for recording and/or reproducing information signals on or from the first magnetic disc 42 of low recording capacity and low recording density when the first magnetic head 42 is loaded on the disc table 141. The second head chip 202 is used for recording and/or reproducing information signals on or from the second magnetic disc 62 of high recording capacity and high recording density when the second magnetic head 62 is loaded on the disc table 141.

On the proximal end of the head slider 203, opposite to the surface thereof facing the first or second magnetic disc 42 or 62, there is provided a first core unit 208 made up of a core forming member 205 constituting the proximal end of the magnetic head 155 and first and second coil supporting members 206, 207 mounted on both sides of the core forming member 205, as shown in FIG. 13. The first and second coil supporting members 206, 207 of the core unit 208 support first and second coils 211, 212 placed around first and second bobbins 209, 210, as shown in FIG. 13.

The first core unit 208 supporting the first and second coils 211, 212 constitutes a first transducer for accessing the first magnetic disc 42 along with the first head chip 201.

The head slider 203 constituting the magnetic head 155 is made up of a first slider unit 216, into which is built the second head chip 202, a second sliding unit 217 arranged between the first slider unit 216 and the first head chip 201 and a third slider unit 218 clinching the first head chip 201 along with the second sliding unit 217.

Figure 14:
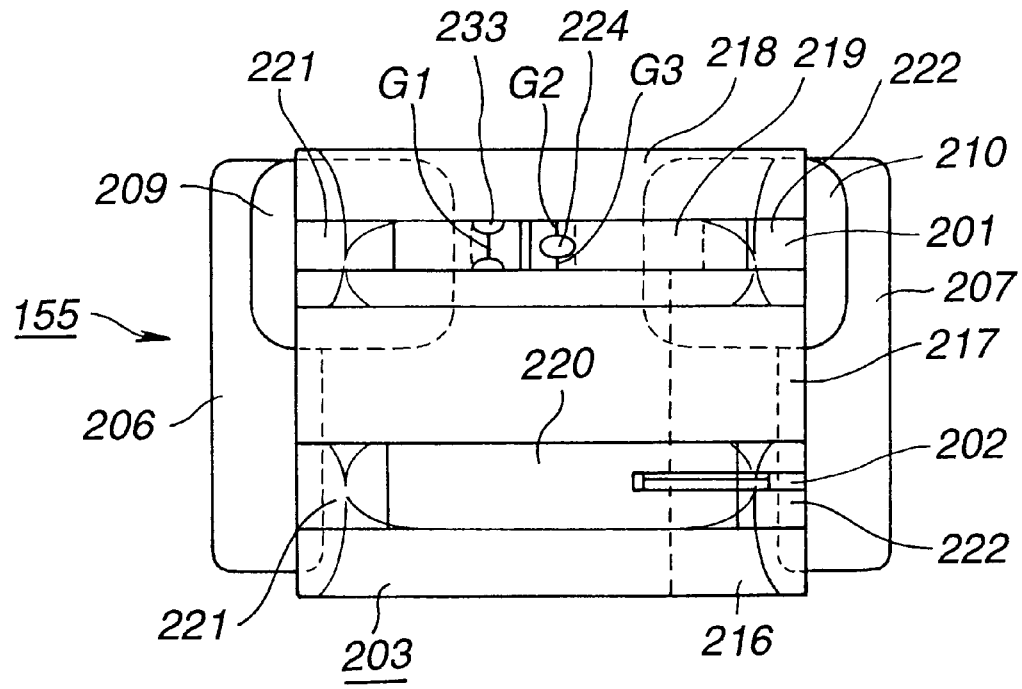
FIG. 14 is a plan view of the magnetic head.

That is, the head slider 203 has the first slider unit 216 and the first head chip 201 connected to both sides of the centrally arranged second sliding unit 217 and also has the third slider unit 218 connected to the lateral side of the first slider unit 216, as shown in FIGS. 13 and 14.

On the surface of the head slider 203 facing the first or second magnetic disc 42 or 62, there are formed rails 219, 220 which run substantially parallel to the tangential direction R of the recording track formed on the first or second magnetic disc 42 or 62 as shown in FIG. 13 when the magnetic head 155 constituted using this head slider 203 is mounted on the first and second head supporting arms 152, 153 and arranged in this state on the magnetic disc apparatus. When the second magnetic disc 62 is run in rotation at an rpm exceeding 300 in the direction indicated by arrow R in FIG. 13, these rails 219, 220 allow an air film to be formed between the head slider 203 proximate to the second magnetic disc 62 and the second magnetic disc 62 to allow the head slider 203 to be floated from the major surface of the second magnetic disc 62.

When the first or second magnetic disc 42 or 62 loaded on the disc table 114 and run in rotation in unison therewith is run in rotation in the direction indicated by arrow R in FIG. 13, front tapered portions 221, 221 are formed on the intruding side of the magnetic disc 42 or 62 to the rails 219, 220, while rear tapered portions 222, 222 are formed on the retreating side of the magnetic disc 42 or 62. When the head slider 203 is parallel to and in contact with the major surface of the magnetic disc 42 or 62, the front tapered portions 221, 221 are inclined at an angle of approximately 0.5° relative to the major surface of the magnetic disc 42 or 62, while the rear tapered portions 222, 222 are inclined at an angle of approximately 20° relative to the major surface of the magnetic disc 42 or 62.

The first head chip 201 constituting the head slider 203 is provided at an approximately mid portion in the longitudinal direction thereof with a recording/reproducing head 223 and an erasure head 224. The erasure head 224 is provided on the downstream side of the recording/reproducing head 223 in the rotational direction of the magnetic head 42 or 62 when the magnetic disc 42 or 62 is rotated in the direction indicated by arrow R in FIG. 13. The first head chip 201 constitutes a first transducer recording/reproducing information signals on or from the first magnetic disc 42 of the low recording density type having the recording capacity of not more than 2 Megabyte. The recording/reproducing head 223 provided on the first head chip 201 has a magnetic gap G1 slightly larger than the track width of the recording track formed on the first head chip 201. The erasure head 224 is provided on the downstream side of the magnetic gap G1 in the rotational direction of the magnetic head 42 and has magnetic gaps G2, G3 at both ends along the width of the magnetic gap G1.

When recording information signals on the first magnetic disc 42, the first head chip 201 records information signals on the first magnetic disc 42 by the magnetic gap G1 of the recording/reproducing head 223, while erasing both sides along the width of the recording track formed by recording information signals by the recording/reproducing head 223 to a predetermined width by the magnetic gaps G2, G3 of the erasure head 224 in order to form a guard band between two neighboring tracks.

The second head chip 202, constituting the second transducer for high recording density built into the first slider unit 216 of the head slider 203, has a magnetic gap capable of forming a recording track narrower in width than that formed by the recording/reproducing head 223, and uses e.g., a metal-in-gap head (MIG head). This first slider unit 216 is formed by embedding the second head chip 202 in a slider member formed using e.g., ceramics.

Figure 15:
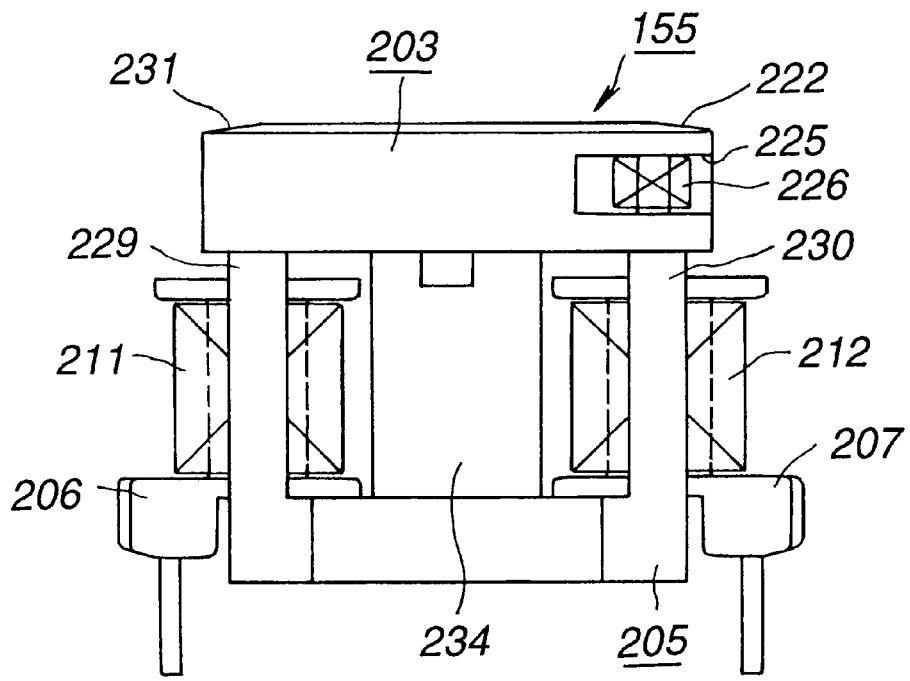
FIG. 15 is a backside view of the magnetic head.
Figure 16:
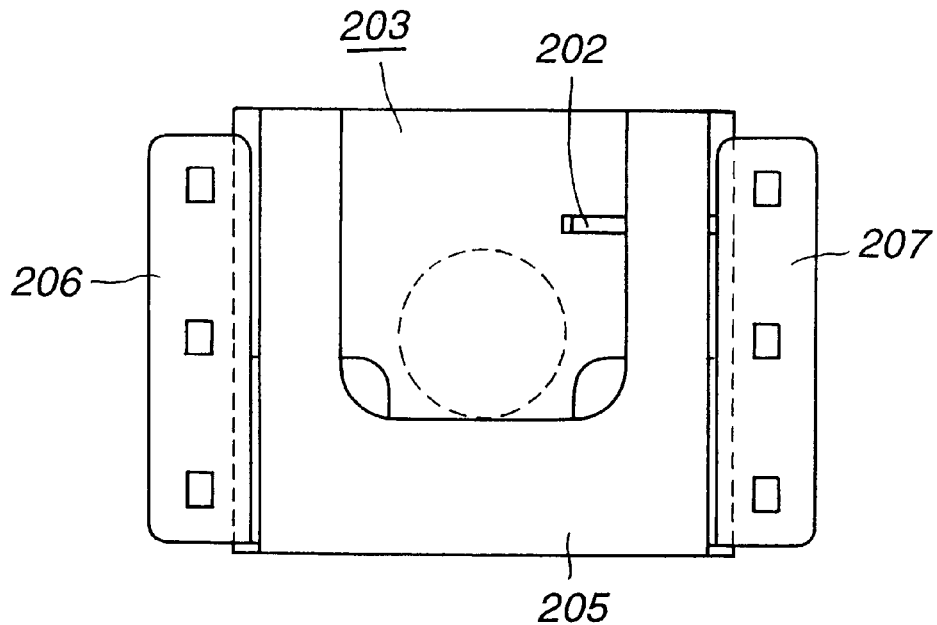
FIG. 16 is a bottom view of the magnetic head.

The first slider unit 216, into which is built the second head chip 202, is formed with a cut-out recess 225 for partially exposing the second head chip 202 to outside, as shown in FIG. 13. In the cut-out recess 225, the portion of the second head chip 202 which serves as the magnetic core is partially exposed to outside. Within the cut-out recess 225 is arranged a coil 226 for the second head chip 202, as shown in FIG. 15. This coil 226 is small-sized in meeting with the small-sized second head chip 202. The small-sized coil 226 is arranged in proximity to the small-sized second head chip 202. The cut-out recess 225 is formed in the first slider unit 216 for magnetic coupling to the second head chip 202 and the coil 226 is placed in this cut-out recess 225.

The second head chip 202 and the portion constituting the second core facing the inside of the cut-out recess 225 in the second head chip 202 constitute the second transducer for recording/reproducing information signals on or from the second magnetic disc 62.

A core-forming member 205, mounted on the head slider 203, includes a substantially U-shaped coupling portion 227, formed of a magnetic material, first and second legs 229, 230 of a non-magnetic material, set substantially upright on the opening side end of the coupling portion 227 and third to fifth legs 231, 232, 233 of a magnetic material set substantially upright on one side of the coupling portion 227. The third and fifth legs 231, 233 are set at the corners of the coupling portion 227, and the fourth leg 232 is set between the third and fifth legs 231, 233. The upper end face of the fourth leg 232 facing the head slider 203 is formed with a groove 234 on both sides of which are formed first and second projections 235, 236.

On the distal end of the first coil supporting member 206, mounted on the core forming member 205 to constitute the core unit 208, there is formed a tubular first bobbin 209 on both ends of which are formed flanges 209a, 209b, as shown in FIG. 13. On the peripheral surface of the bobbin 209 is placed a first coil 211. The first bobbin 209 has a center through-hole 209c, in register with the third leg 231, so as to be passed through by the third leg 231. Similarly to the first coil supporting member 206, the second coil supporting member 207 has, on its distal end, a tubular second bobbin 210 on both ends of which are formed flanges 210a, 210b, as shown in FIG. 13. On the peripheral surface of the bobbin 210 is placed a second coil 212. The second bobbin 210 has a center through-hole 210c, in register with the fifth leg 233, so as to be passed through by the fifth leg 233.

The first and second coil supporting members 206, 207 are mounted facing each other on both sides of the core forming member 205 to constitute the core unit 208, with the first and second coils 211, 212 placed around the first and second bobbins 209, 210, respectively, and with the third and fifth legs 231, 233 passed through the through-holes 209c, 210c of the first and second bobbins 209, 210, respectively.

Figure 17:
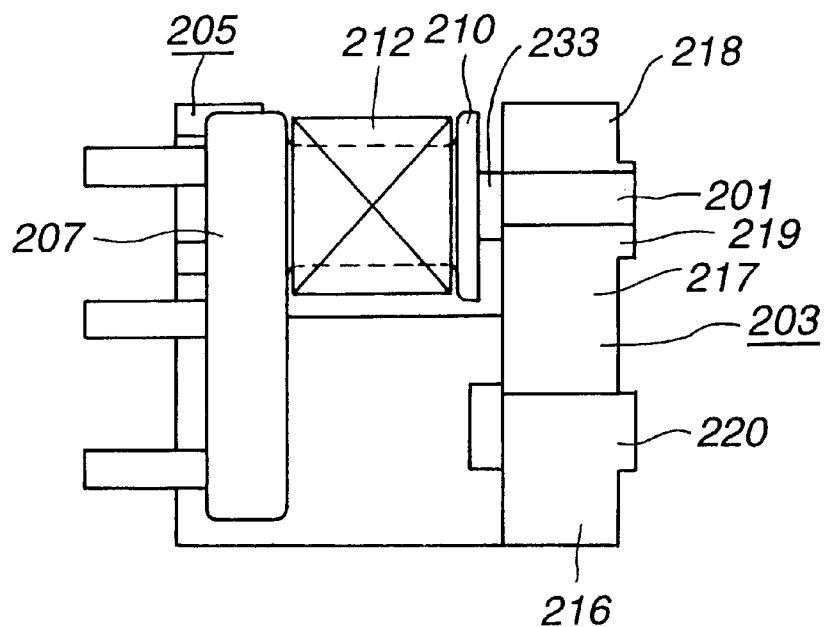
FIG. 17 is a side view of the magnetic head.

Referring to FIGS. 15 and 17, the core unit 208 is completed by abutting the end faces of the first to fifth legs 229 to 233 provided on the core forming member 205 on the lower surface of the head slider 203 opposite to its surface facing the first or second magnetic disc 42 or 62, and by unifying them together using an adhesive such as an epoxy-based adhesive. At this time, the first and second legs 229, 230 compress against vicinity of the both ends of the first slider unit 216 constituting the head slider 203, as shown in FIG. 15. The third leg 231 has its distal end face abutted against the lower surface of the head slider 203 for magnetic coupling with the recording/reproducing head 223 constituting the first head chip 201, while the fifth leg 233 has its distal end face abutted against the lower surface of the head slider 203 for magnetic coupling with the erasure head 224 constituting the first head chip 201.

Thus, the third and fourth legs 231, 232 constitute the magnetic core of the recording/reproducing head 223 by the core unit 208 compressing against the head slider 203. That is, in the recording/reproducing head 223, a magnetic path is defined between the third leg 231 carrying the first coil 211 and the first projection 235 of the fourth leg 232. Also, the fifth and fourth legs 233, 232 constitute a magnetic core of the erasure head 224 by the core unit 208 compressing against the head slider 203. That is, in the erasure head 224, a magnetic path is defined between the fifth leg 233 carrying the second coil 212 and the second projection 236 mounted on the fourth leg 232.

The magnetic head apparatus 151, constituting the magnetic disc apparatus according to the present invention, has a pivoting member for pivotally supporting the above-described magnetic head 155 on the distal end of the first or second head supporting arm 152, 153. A gimbal spring 241 is used as a member for pivotally supporting the magnetic head 155. The gimbal spring 241, formed by punching a thin metal plate of, for example, stainless steel or phosphor bronze, is of a flat rectangular shape, and has at its mid portion a head mounting portion 242 on which to mount the head slider 203 constituting the magnetic head 155, as shown in FIG. 18.

The head slider 203 serves as a mounting portion for the gimbal spring 241 used as a pivotal member.

Figure 18:
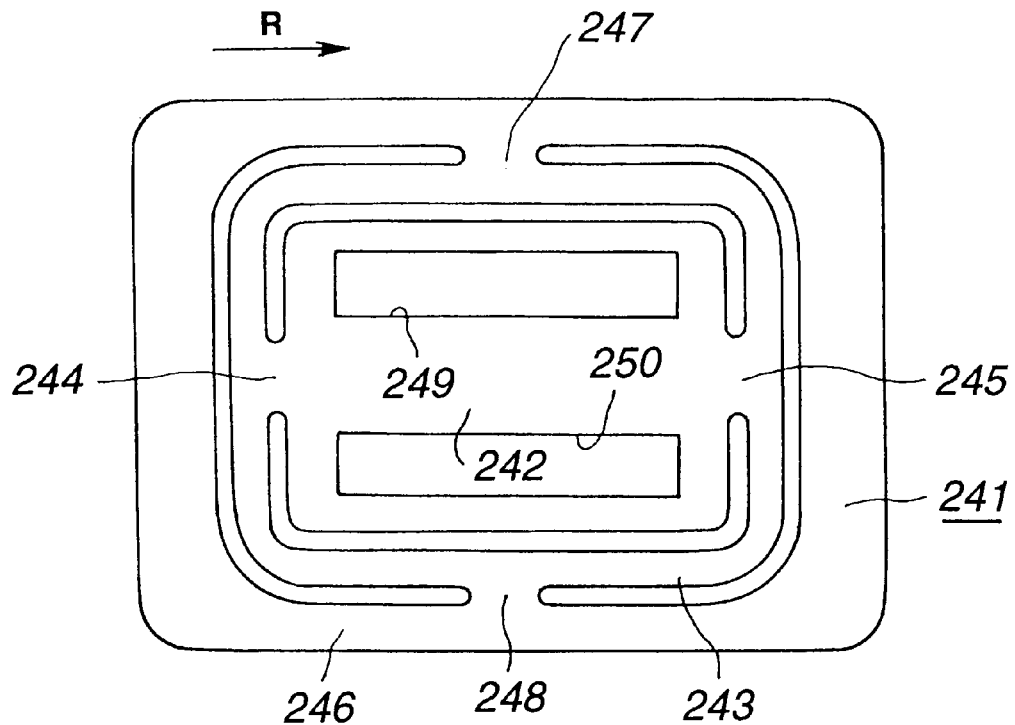
FIG. 18 is a plan view showing a gimbal spring pivotally supporting the magnetic head on the head supporting arm.

The gimbal spring 241 has a first annular frame 243 for surrounding the rim of the head mounting portion 242, as shown in FIG. 18. The head mounting portion 242 is connected to the first annular frame 243 via paired first connecting portions 244, 245 protuberantly formed on both opposite sides of the short sides of the head mounting portion 242. The head mounting portion 242 can be rotationally displaced about the first connecting portions 244, 245 as the center of rotation.

The gimbal spring 241 is also formed with a second annular frame 246 for surrounding the outer periphery of the first annular frame 243. The first annular frame 243 is connected to the second annular frame 246 via paired second connecting portions 247, 248 projected from the opposite sides along the long side direction perpendicular to its short side direction along which the first connecting portions 244, 245 are formed. The first annular frame 243 can be rotationally displaced, along with the head mounting portion 242, about the second connecting portions 247, 248 as the rotational axis.

When built into the magnetic head 155 and mounted in this state on the magnetic disc apparatus, the gimbal spring 241 has the coupling direction to the first connecting portions 244, 245 parallel to the tangential direction R of the recording track formed in the first or second magnetic disc 42 or 62, as shown in FIG. 18.

The head mounting portion 242, formed on the gimbal spring 241, is formed with paired first and second apertures 249, 250 extending parallel to the coupling direction of the first connecting portions 244, 245 which in turn is parallel to the tangential direction R to the recording track formed in the first or second magnetic disc 42 or 62.

The above-described gimbal spring 241 is mounted on the magnetic head 155 provided with the head slider 203 and the core unit 208. Specifically, the gimbal spring 241 is mounted between the head slider 203 and the core unit 208. At this time, the head slider 203 is mounted on the head mounting portion 242 of the gimbal spring 241 with the first slider unit 216 positioned in the first aperture 249 and with the first head chip 201 positioned in the second aperture 250. The core forming member 205 is unified with the head slider 203 by inserting the first and second legs 229, 230 in the first aperture 249, abutting the end faces of these legs 229, 230 against the lower surface of the first slider unit 216, inserting the third to fifth legs 231 to 233 in the second aperture 250 and by abutting the end faces of the legs 231 to 233 against the lower surface of the first head chip 201. The core forming member 205 is again unified to the head slider 203 using an adhesive, such as an epoxy-based adhesive.

Since the magnetic head 155 used in the present invention is produced by mounting the head slider 203 on one surface of the gimbal spring 241 and by abutting the core forming member 205 against the head slider 203 from the opposite surface side of the gimbal spring 241, the gimbal spring 241 is arranged in a mid position along the height-wise direction of the magnetic head 155 between the head slider 203 and the core forming member 205.

The magnetic head 155 is supported by the first and second head supporting arms 152, 153 by connecting the second annular frame 246 corresponding to the outermost rim of the gimbal spring 241 to the distal end face of a spacer member 251 mounted on the distal end of a head supporting spring 163 constituting the first and second head supporting arms 152, 153, the second annular frame 246 operates as a mounting portion for the spacer member 251 of the gimbal spring 241.

Figure 19:
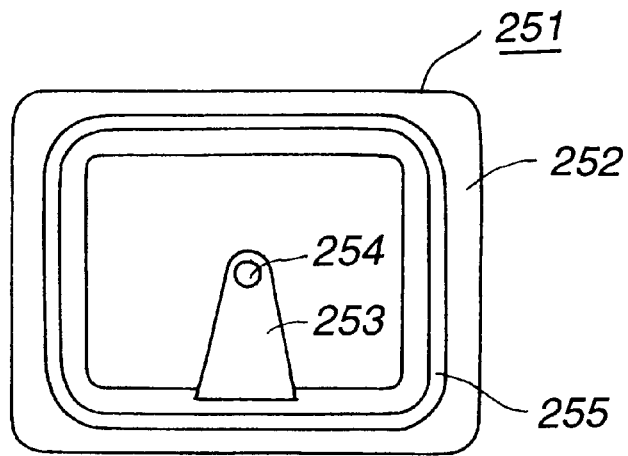
FIG. 19 is a plan view showing a spacer member carrying a gimbal spring built into the magnetic head.
Figure 20:
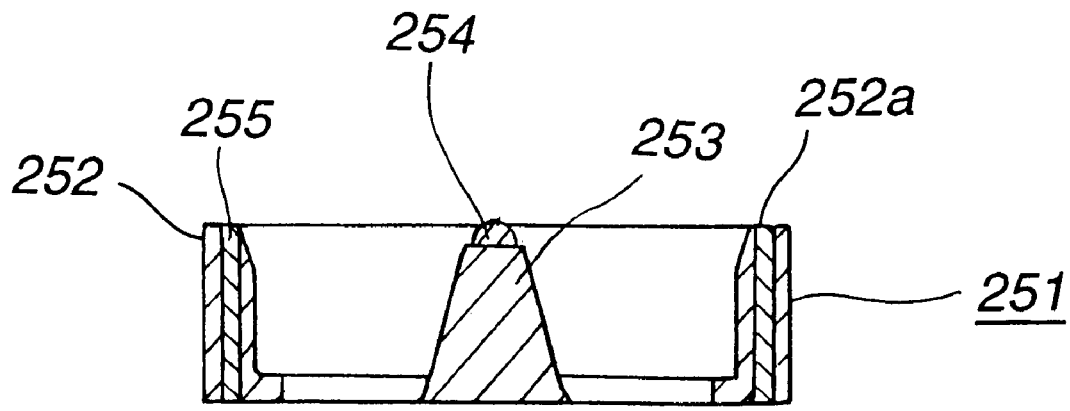
FIG. 20 is a longitudinal cross-sectional view of the spacer member.
Figure 21:
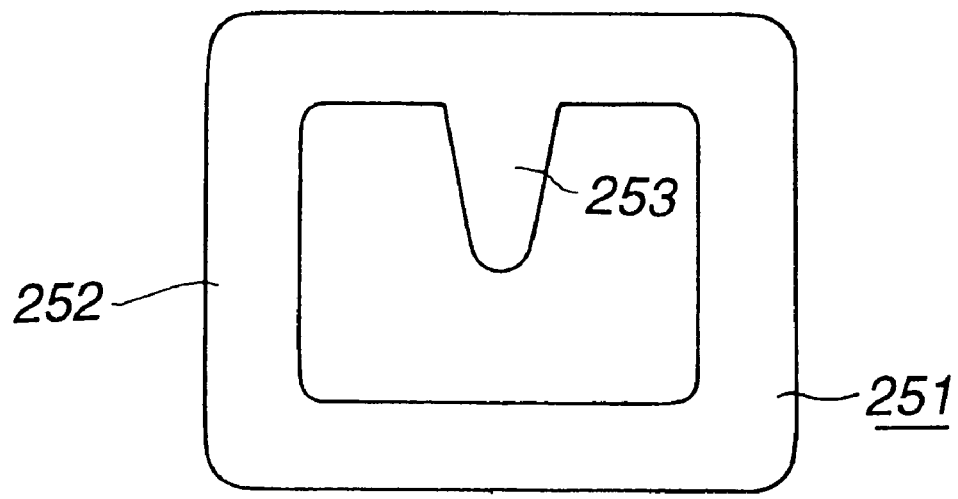
FIG. 21 is a bottom view of the spacer member.
Figure 22:
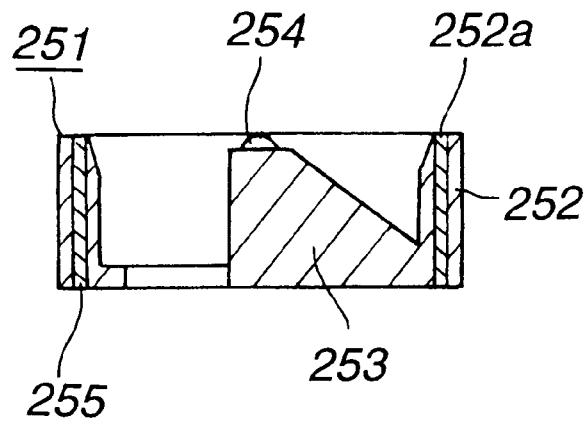
FIG. 22 is a longitudinal cross-sectional side view of the spacer member.
Figure 23:
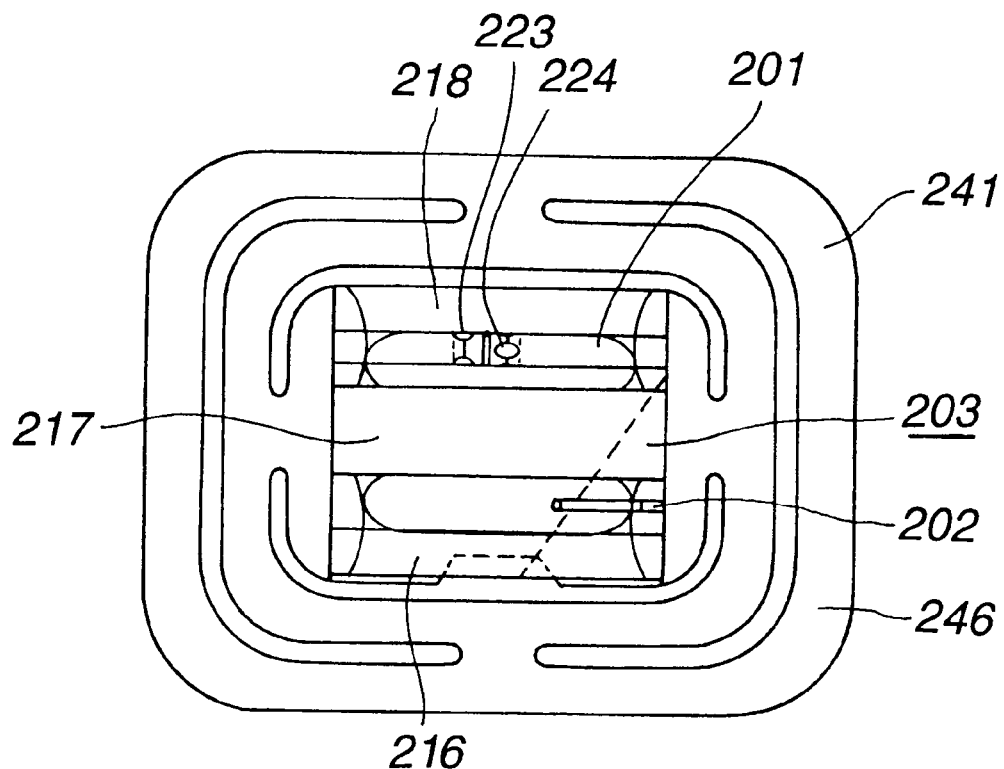
FIG. 23 is a plan view showing the state in which a gimbal spring built into the magnetic head is mounted on the spacer member.
Figure 24:
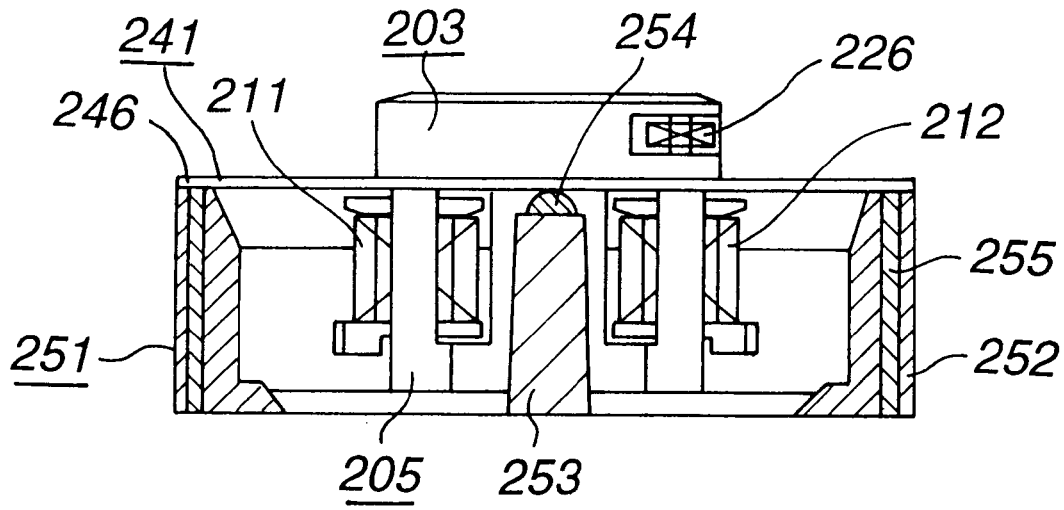
FIG. 24 is a side view, partially shown in cross-section, and showing the state in which a gimbal spring built into the magnetic head is mounted on the spacer member.
Figure 25:
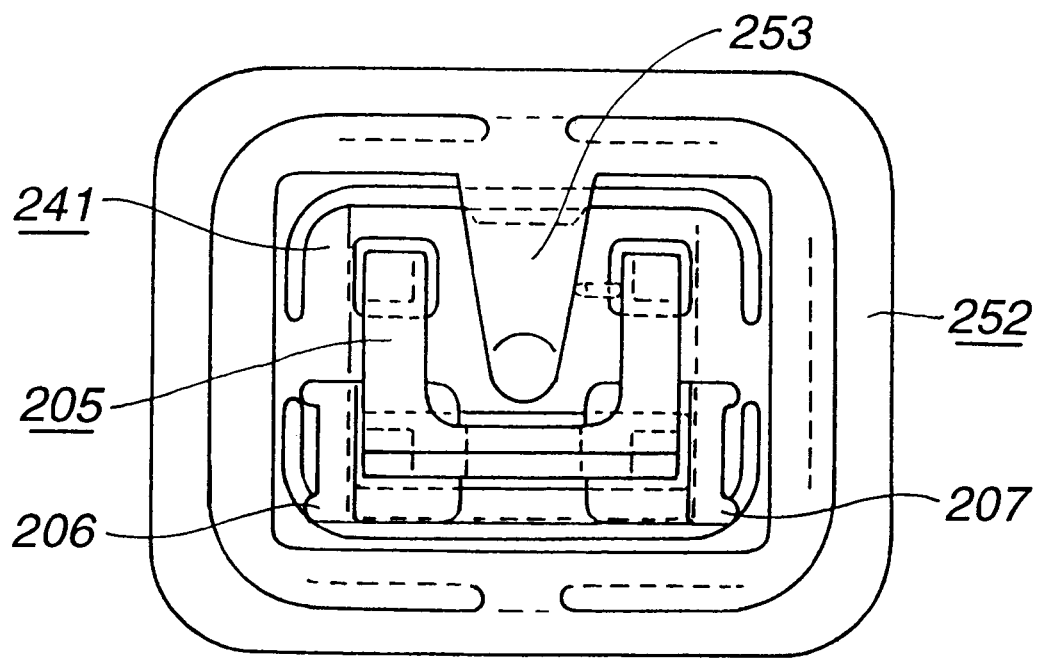
FIG. 25 is a bottom view showing the state in which the gimbal spring built into the magnetic head is mounted on the spacer member.
Figure 26:
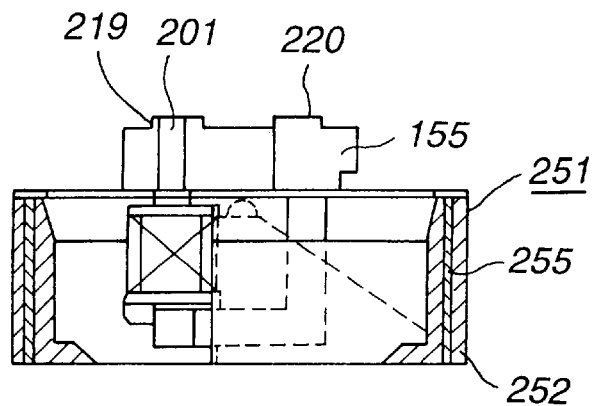
FIG. 26 is a side view showing the state in which the gimbal spring built into the magnetic head is mounted on the spacer member.
Figure 27:
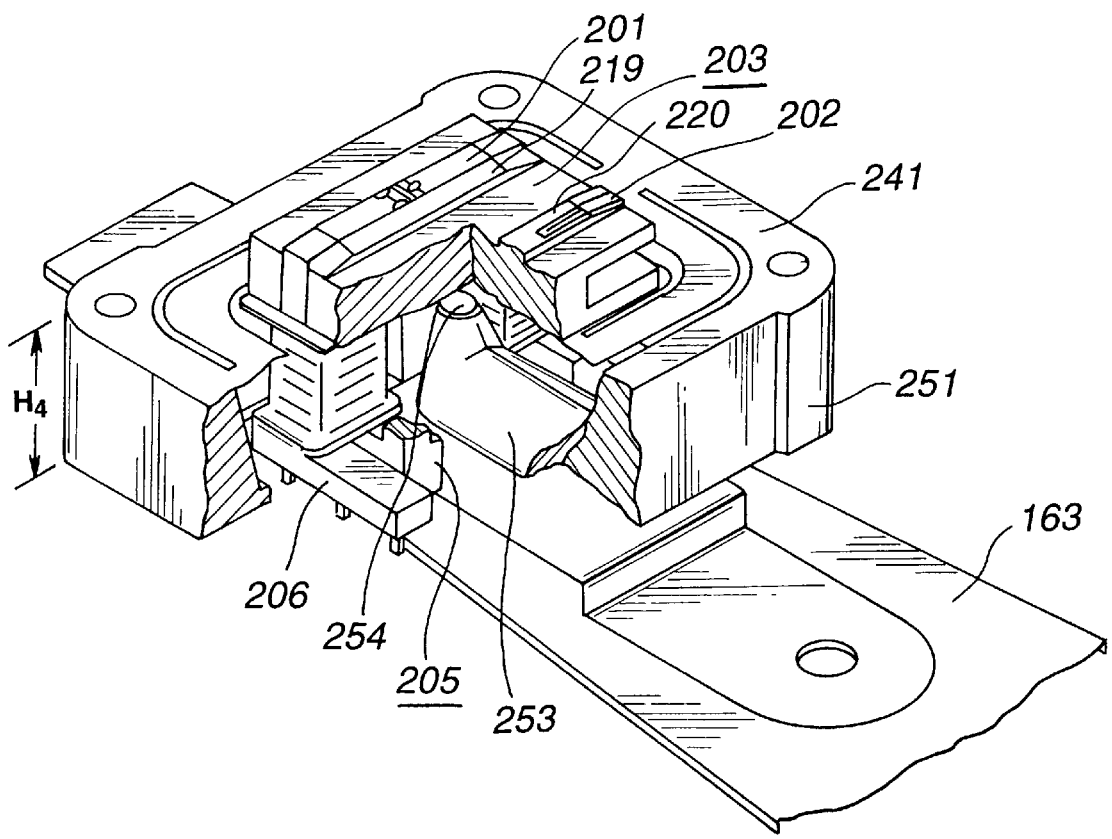
FIG. 27 is a perspective view, partially shown in cross-section, and showing the state in which a spacer member supporting the magnetic head via a gimbal spring is mounted on the head supporting arm.

The spacer member 251, used for mounting the magnetic head 155 on the distal end of the head supporting spring 163, has a main spacer member 252, rectangular in cross-section, as shown in FIGS. 19 to 21. There is protuberantly formed a semi-spherically shaped pivot 254 on the distal end of a projection 253 protuberantly formed towards the center of the main spacer member 252 from a side of the proximal end of the main spacer member 252.

The main spacer member 252, constituting the spacer member 251, is tubular in shape and has a size sufficient to hold the core unit 208 of the magnetic head 155 and which is substantially equal to the size of the second annular frame 246 of the gimbal spring 241. In this spacer member 251 is buried a magnetic shielding member 255 formed of a high-permeability magnetic material, as shown in FIG. 20. The pivot 254, formed at the distal end of the projection 253, has a height such that the gimbal spring 241 at the distal end of the projection 253 has a height such that its distal end is slightly projected from a spring mounting surface 252a of the main spacer member 252 carrying the gimbal spring 241.

The above-described spacer 251 is formed of synthetic resin and are molded as one from the main spacer member 252, projection 253 and the pivot 254.

On the spacer member 251 is mounted the gimbal spring 241, carrying the magnetic head 155, as shown in FIGS. 23 to 26. The gimbal spring 241 is mounted on the distal end of the spacer member 251 with the head slider 203, mounted on its one surface, facing upwards, with the other surface of the second annular frame 246 connected to the spring mounting surface 252a on the distal end of the main spacer member 252 and with the head mounting portion 242 set on the pivot 254. By mounting the gimbal spring 241 on the spacer member 251 in this manner, the mid portion of the head mounting portion 242 is supported by the pivot 254 having a height slightly protruded from the spring mounting surface 252a. Since the head mounting portion 242 has its mid portion supported at a point by the pivot 254, it can be rotationally displaced in two mutually orthogonal directions about the paired first connecting portions 244, 245 and second connecting portions 247, 248 as the rotational axis.

The spacer member 251, carrying the gimbal spring 241 as described above, has the proximal end face opposite to the distal end face carrying the gimbal spring 241 mounted on the distal end of the head supporting spring 163 constituting the first head supporting arm 152 and the second head supporting arm 153. At this time, the spacer members 251, 251 are arranged on the first head supporting arm 152 and the second head supporting arm 153 so that the spacer members 251, 251 face each other.

The spacer member 251 is of a height H4 such that, when the magnetic heads 155, 155, mounted on the distal ends of the first and second head supporting arms 152, 153, are contacted with the major surfaces of the first or second magnetic disc 42 or 62, the first and second head supporting arms 152, 153 are extended on the upper and lower surfaces of the first or second disc cartridge 41 or 61 loaded on the cartridge loading unit 125 without contacting with the first or second disc cartridge 41 or 61.

With the magnetic disc apparatus of the present invention, as described above, information signals can be recorded and/or reproduced selectively using the first magnetic disc 42 for recording information signals at a first recording density or a second magnetic disc 62 for recording information signals at a second recording density.

If the information signals are recorded on or reproduced from the first magnetic disc 42 loaded on the disc table 114 of the disc rotation unit 111, the first magnetic disc 42 is run in rotation with the magnetic heads 155, 155 mounted on the distal ends of the first and second head supporting arms 152, 153 kept in contact with the signal recording portion of the first magnetic disc 42. At this time, the magnetic disc 42 is rotated at an rpm of approximately 300 and information signals are recorded and/or reproduced using the first head chip 201. A magnetic path is formed across the third leg 231, fourth leg 232 and the recording/reproducing head 223 of the first head chip 201 by the magnetic field generated from the first coil supporting member 206 mounted on the third leg 231. The recording/reproducing head 223 records or reproduces information signals on or from the first magnetic disc 42 run in rotation in unison with the disc table 114. When recording information signals on the first magnetic disc 42 using the first head chip 201, only the vicinity of both sides along the track width of the recording track formed by the recording/reproducing head 223 is erased and a guard band is produced between recording tracks formed by recording information signals, using the magnetic field produced from the second coil supporting member 207 mounted on the fifth leg and the magnetic field formed between the fifth leg, fourth leg 232 and the erasure head 224.

If information signals are recorded or reproduced on or from the second magnetic disc 62 of the second recording density, loaded on the disc table 114, the magnetic head 155 is slightly floated from the major surface of the second magnetic disc 62 carrying the signal recording portion. That is, on detection of loading of the second magnetic disc 62 on the disc table 114, the disc rotation unit 111 allows the second magnetic disc 62 to be rotated at the rpm of approximately 3600. If the second magnetic disc 62 is run in rotation at this high speed, there is induced air convection between the rails 219, 220 provided on the surface of the head slider 203 facing the magnetic disc and the second magnetic disc 62 to produce a so-called air film, such that the magnetic head 155 is floated a predetermined amount from the major surface of the second magnetic disc by the action of this air film, the magnetic head 155 is floated approximately 50 nm from the major surface of the second magnetic disc 62.

The amount of float of the magnetic head 155 from the major surface of the second magnetic disc 62 can be adjusted by varying the width and the height of the rails 219, 220 provided on the head slider. Specifically, for achieving the amount of float of approximately 50 nm of the magnetic head 155, it suffices if the length, width and the height of the rails 219, 220 are 3 mm, 0.3 mm and 0.1 mm, respectively.

For recording/reproducing information signals on or from the second magnetic disc 62, the second head chip 202 of the magnetic head 155 is used.

Meanwhile, the first or second magnetic disc 42 or 62 undergoes deviation from its plane of rotation, when loaded and rotated on the disc table 114, due to lack in polarity of the disc itself. Since the magnetic head 15 used in the present invention is mounted on the spacer member 251 using the gimbal spring 241, the magnetic head 155 is displaced so as to follow the deviation from the plane of rotation of the first or second magnetic disc 42 or 62. That is, since the gimbal spring 241 can be rotationally displaced in two mutually orthogonal directions, about the paired first connecting portions 244, 245 and paired second connecting portions 247, 248, the magnetic head 155, having the head slider 203 secured to the head mounting portion 242, is rotationally displaced in unison with the head mounting portion 242 to change its posture relative to the first or second magnetic disc 42 or 62 in order to follow vibrations or surface deviation of the first or second magnetic disc 42 or 62.

Meanwhile, the magnetic head 155 is mounted on the spacer member 251 via gimbal spring 241 mounted between the head slider 203 and the core unit 208, so that, if vibrations are applied from outside to the magnetic disc apparatus or vibrations are induced in the first or second magnetic disc 42 or 62 which is run in rotation, there is a risk that these vibrations are transmitted to the magnetic head 155 such that the magnetic head 155 is rotationally displaced about the portion of the gimbal spring 241 supported by the pivot 254 as the center of rotation.

With the present magnetic head 155, in which the point of support by the pivot 254 of the gimbal spring 241 operating as a point of rotational displacement is at a mid point in the height-wise direction of the entire magnetic head 155, the amount of rotational displacement due to vibrations is smaller than with the conventional magnetic head the proximal end of which operates as the rotational pivot point. That is, with the present magnetic head 155, the amount of rotational displacement caused by a predetermined vibration can be reduced to permit rotational displacement of the first or second magnetic disc 42 or 62 in a manner to follow up correctly with the surface deviation of the magnetic head.

Also, in the magnetic head 155 used in the magnetic disc apparatus of the present invention, the core unit 208 is mounted on the opposite surface of the gimbal spring 241. Since the core unit 208 supports the first slider unit 216 of the head slider 203 by the first and second legs 229, 230, while supporting the third slider unit 218 by the third to fifth legs 231 to 233, the slider 203 is supported in a weight-balanced state on the core unit 208. That is, since the magnetic head 155, supported by the gimbal spring 241 on the main spacer member 252, is supported in a weight-balanced condition on the main spacer member 252, the magnetic head 155 cam be brought into sliding contact in weight-balanced condition with the first magnetic disc 42 to face the second magnetic disc 62.

Since the spacer member 251 supporting the magnetic head 155 via gimbal spring 241 has the magnetic shielding member 255, the inside of the spacer member 251 is shielded magnetically. That is, the magnetic shielding member 255 provides magnetic sealing in order to prevent the magnetic field emanating from the first and second coils 211, 212 arranged in the spacer member 251 from leaking to outside and in order to prevent the magnetic field outside of the spacer member 251 from intruding into the inside of the spacer member 251. Since the outside magnetic field can be prevented from reaching the first and second coils 211, 212 by the magnetic shielding member 255 provided in the magnetic shielding member 255, the recording/reproducing head 223 or the erasure head 224 loaded on the first head chip 201 can be operated without being affected by the external magnetic field so that information signals can be correctly recorded or reproduced on or from the first magnetic disc 42. Also, with the present magnetic head, the magnetic field emanated from the first and second coils 211, 212 for the first head chip 201 can be prevented from reaching the second head chip 202, so that the second head chip 202 can be operated without being affected by the magnetic field from the first and second coils 211, 212, thereby correctly recording/reproducing information signals on or from the first magnetic disc 62.

Figure 28:
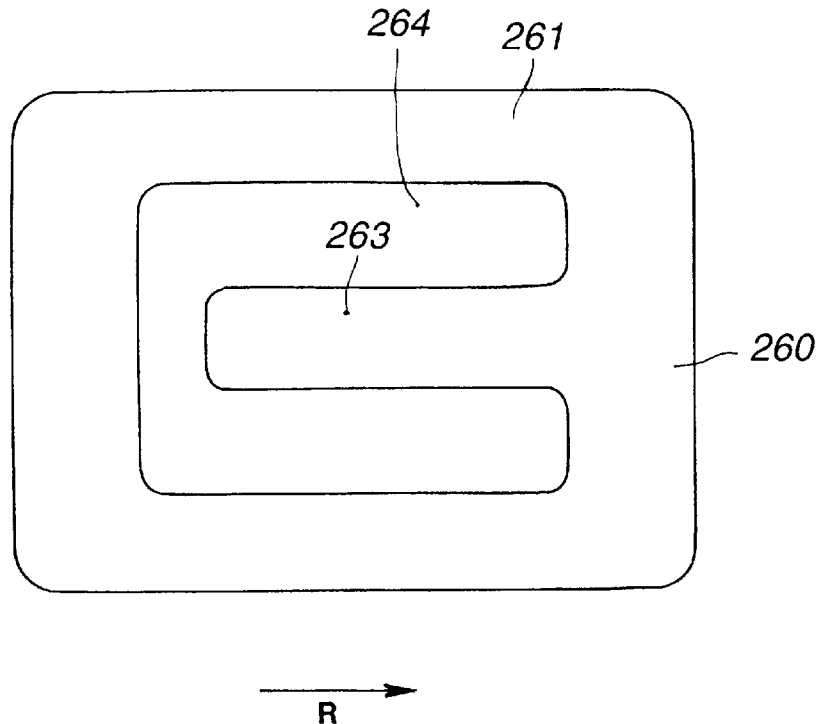
FIG. 28 is a plan view showing another example of a gimbal spring.

The gimbal spring used in the magnetic head 155 is not limited to the above-described configuration. For example, it may be configured as shown in FIG. 28. A gimbal spring 260 shown in FIG. 28 has an annular frame 261 formed in a rectangular shape. A head mounting portion 263 is protuberantly formed from one end of the annular frame 261 towards the inside of the annular frame 261. That is, the head mounting portion 263 has its one end connected to a lateral side of the annular frame 261, while having its opposite end as a free end. Also, when the gimbal spring 260, carrying the magnetic head apparatus 151, is mounted on the magnetic disc apparatus, the projecting direction of the head mounting portion 263 from the annular frame 261 is parallel to the tangential direction R of the recording track R of the recording track formed on the first or second magnetic disc 42 or 62. Moreover, with the present gimbal spring 260, there is formed an opening 264 having a size sufficient to permit the first to fifth legs 229 to 233 of the core unit 208 to be inserted therein. Meanwhile, the annular frame 261 has a size larger than the outer size of the head slider 203.

On a surface of the head mounting portion 263 of the gimbal spring 260, constructed as described above, the head slider 203 is mounted with its surface carrying the rails 219, 220 facing upwards. The core unit 208 is abutted against the head slider 203 from the opposite side surface of the gimbal spring 260 so as to be unified with the head slider 203. Specifically, the core unit 208 is unified with the head slider 203 by inserting the first and second legs 229, 230 inserted in the portion of the aperture 264 on one side of the head mounting portion 263 until the distal end faces of these legs 229, 230 compress against the lower surface of the first slider unit 216, and by inserting the third to fifth legs 231 to 233 in the portion of the aperture 264 lying on the opposite side of the head mounting portion 263 until the distal end faces of these legs 231 to 233 compress against the lower surface of the first head chip 201.

The gimbal spring 260, now carrying the head slider 203 unified with the core unit 208, is mounted on the distal end of the spacer member 251, with the head slider 203 mounted on its one surface directing upwards, with the opposite side surface of the annular frame 261 operating as the mounting portion secured to the spring mounting surface 252a on the distal end of the main spacer member 252 and with the head mounting portion 263 set on the pivot 254.

The head mounting portion 263, provided on the above-described gimbal spring 260, has its one end connected to the side of the annular frame 261 and has its other end as a free end, so that it can be rotationally displaced in the torsional direction with respect to the annular frame 261. The magnetic head 155, having the head slider 203 secured to the head mounting portion 263, is rotationally displaced about the direction proceeding from the connecting portion of the head mounting portion 263 to the annular frame 261 to its free end as the center axis.

Also, the head mounting portion 263, having its one end connected to the annular frame 261 and having its free end supported by the pivot 254, can be displaced in a direction perpendicular to the plane of the gimbal spring 260, with the connecting side as a fulcrum point. Therefore, the magnetic head 155, having the head slider 203 secured to the head mounting portion 263, can be displaced in the vertical direction relative to the major surface of the first or second magnetic disc 42 or 62 loaded on the disc table 114.

For facilitating and enhancing displacement of the head mounting portion 263 provided on the gimbal spring 260 in a direction perpendicular to the major surface of the first or second magnetic disc 42 or 62, the head mounting portion 263 in its entirety is preferably thinner in thickness than other portions of the gimbal spring 260. Alternatively, the connecting portion of the head mounting portion 263 to the annular frame 261 is preferably increased in thickness.

Figure 29:
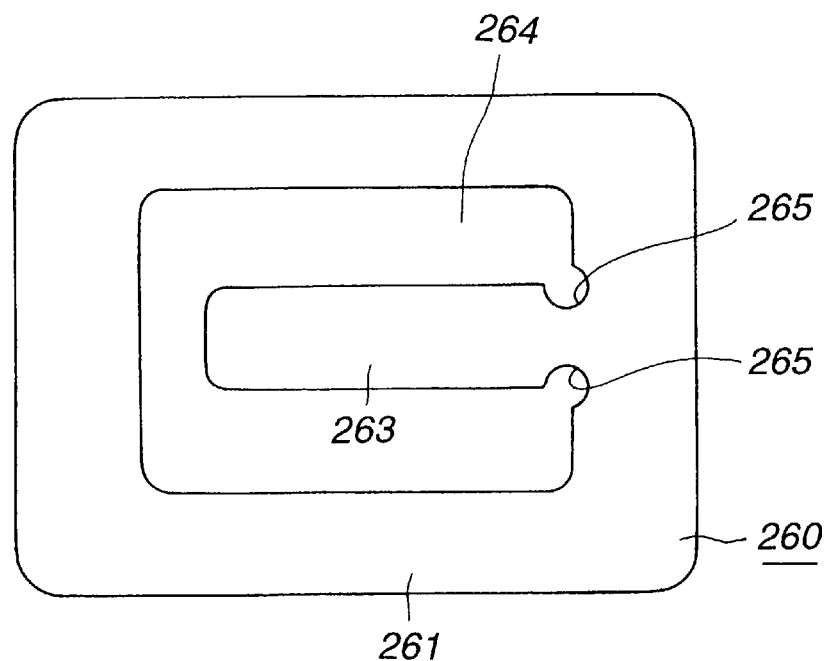
FIG. 29 is a plan view showing another example of a gimbal spring.

The gimbal spring 260 may also be designed so that substantially circular cut-outs 265, 265 are formed on both sides of the junction of the head mounting portion 263 to the annular frame 261 in order to reduce the width of the junction of the head mounting portion 263 to the annular frame 261 to enhance displacement in the torsional direction of the head mounting portion 263, as shown in FIG. 29. Since the magnetic head 155 having this gimbal spring 260 can be displaced significantly in the torsional direction, it can follow up more satisfactorily with the surface deviation of the first or second magnetic disc 42 or 62.

Figure 30:
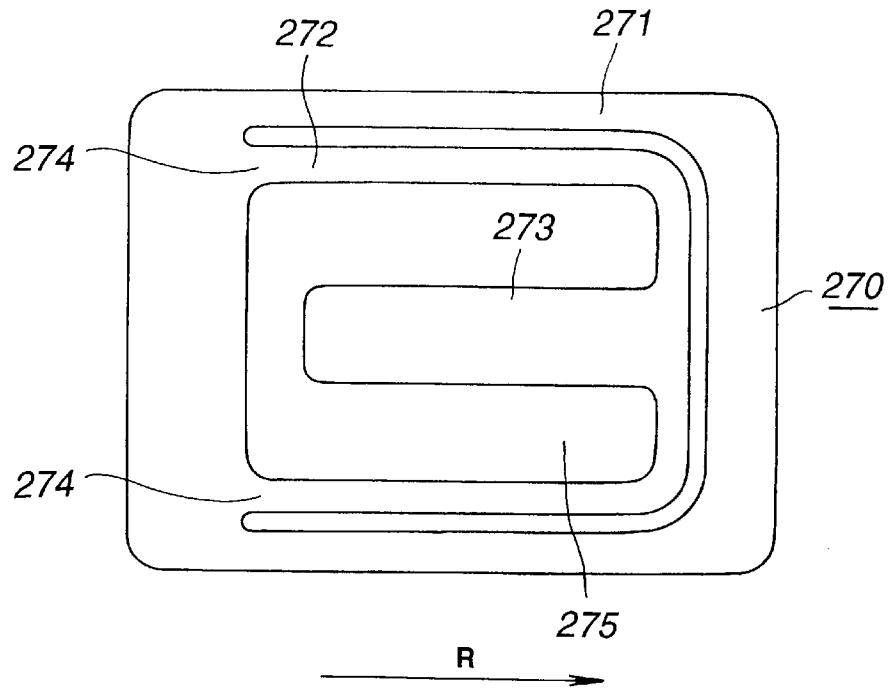
FIG. 30 is a plan view showing yet another example of a gimbal spring.

FIG. 30 shows a modification of the gimbal spring. A gimbal spring 270, shown in FIG. 30, has a U-shaped frame 272 on the inner side of an outermost annular frame 271. A head mounting portion 273 is formed to project into the inner side from the connecting portion of the U-shape. When built into the magnetic head 155 and assembled in this state on the magnetic disc apparatus, the connecting direction of connecting portions 274, 274 of the U-shaped frame 272 to the annular frame 271 is set so as to be parallel to the tangential direction R to the recording track formed in the first or second magnetic disc 42 or 62.

The head mounting portion 273 has its one end connected to the connecting portion of the U-shaped frame 272 and its other end as a free end, and is designed so as to extend parallel to the tangential direction R of the recording track formed in the first or second magnetic disc 42 or 62. That is, the gimbal spring 270 is configured so that the connecting direction of the connecting portions 274, 274 on both sides of the U-shaped frame 272 and the direction of extension of the head mounting portion 273 run parallel to the tangential direction R of the recording track formed on the first or second magnetic disc 42 or 62.

With the gimbal spring 270, shown in FIG. 30, there is defined between a side of the head mounting portion 273 in the U-shaped frame 272 and the U-shaped frame 272 an opening 275 in which are inserted the first to fifth legs 229 to 233 of the core unit 208. This gimbal spring 270 is configured so that, when the gimbal spring 270 is mounted on the spacer member 251, with the outermost annular frame 271 secured to the spring mounting surface 252a on the distal end of the main spacer member 252, the U-shaped frame 272 is positioned on the inner side of the main spacer member 252.

With the above-described gimbal spring 270, similarly to the gimbal springs 241 and 260, the head slider 203 is mounted on one surface of the head mounting portion 273 and the core unit 208 is arranged on the opposite surface of the head mounting portion 273. That is, the first to fifth legs 229 to 233 of the core unit 208 are inserted into the opening 275 so as to be unified to the head slider 203, as in the case of the gimbal springs 241 and 260.

With the gimbal spring 270, configured as shown in FIG. 30, the U-shaped frame 272 and the head mounting portion 273 can be rotationally displaced in a substantially vertical direction perpendicular to the major surface of the magnetic disc 42 or 62, about the connecting portions 274, 274 on both sides of the U-shaped frame 272 as fulcrum. Also, with the gimbal spring 270, the head mounting portion 273 can be displaced in substantially the vertical direction perpendicular to the major surfaces of the first or second magnetic disc 42 or 62 about the junction of the head mounting portion 273 to the U-shaped frame 272 as center. In addition, with the present gimbal spring 270, the U-shaped frame 272 and the head mounting portion 273 can be displaced in the torsional direction perpendicular to the plane of the gimbal spring 270 about the junction of the connecting portions 274, 274 and the head mounting portion 273 to the U-shaped frame 272 as center.

If the magnetic head 155 is mounted on the distal ends of the first head supporting arm 152 and the second head supporting arm 153, the magnetic head 155 can be pivotally displaced so as to follow up with surface deviation of the first or second magnetic disc 42 or 62 loaded on the disc table 144 so as to be rotated in unison with the disc table 144.

In the present gimbal spring 270, the junction of the connecting portions 274, 274 on both sides of the U-shaped frame 272 and the junction of the head mounting portion 273 to the U-shaped frame 272 may be formed with cut-out recesses to reduce the width in order to assure facilitated pivoting movement of the magnetic head 155.

In any of the above-described gimbal springs 241, 260 and 270, the gimbal spring is arranged between the head slider 203 and the core unit 208 and the opposite surface of the head mounting portion 242, 263 or 273 to the head slider mounting surface is supported by the pivot 254 provided on the spacer member 251, so that, when the magnetic head is pivotally displaced by vibrations applied from outside the magnetic disc apparatus or vibrations transmitted from the rotating first or second magnetic disc 42 or 62, it is pivotally displaced about the intermediate point in the height-wise direction of the magnetic head 155, thus reducing the rotational force applied to the magnetic head 155 in its entirety and the pivotal displacement of the magnetic head. Thus, if vibrations applied from outside the magnetic disc apparatus or from the rotating first or second magnetic disc 42 or 62 are removed, the magnetic head can be immediately pivotally displaced to follow up with the surface deviation of the first or second magnetic disc 42 or 62 to enable correct accessing of the recording track of the first or second magnetic disc 42 or 62.

Specifically, spring constants of the above-described gimbal springs 241, 260, 270 were measured. The spring constants were compared to one another by applying predetermined moment (1 mNmm) to the magnetic head 155 and by measuring the amount of displacement of the magnetic head 155 from its reference plane in the height-wise direction, for the thicknesses of the gimbal springs 241, 260, 270 equal to 0.3 mm. It was found that, with the gimbal spring 241 shown in FIG. 18, the displacement of the magnetic head 155 from its reference plane along the height-wise direction is $2\times10^{-3}$ mm, whereas, with the gimbal springs 260, 270 shown in FIGS. 28 and 30, the displacement of the magnetic head 155 from its reference plane along the height-wise direction is $1.3\times10^{-2}$ mm. It is seen from the above results that, with the gimbal springs 260, 270, shown in FIGS. 28 and 30, the magnetic head 155 is displaced significantly from its reference plane, thus reducing the spring constants.

Figure 31:
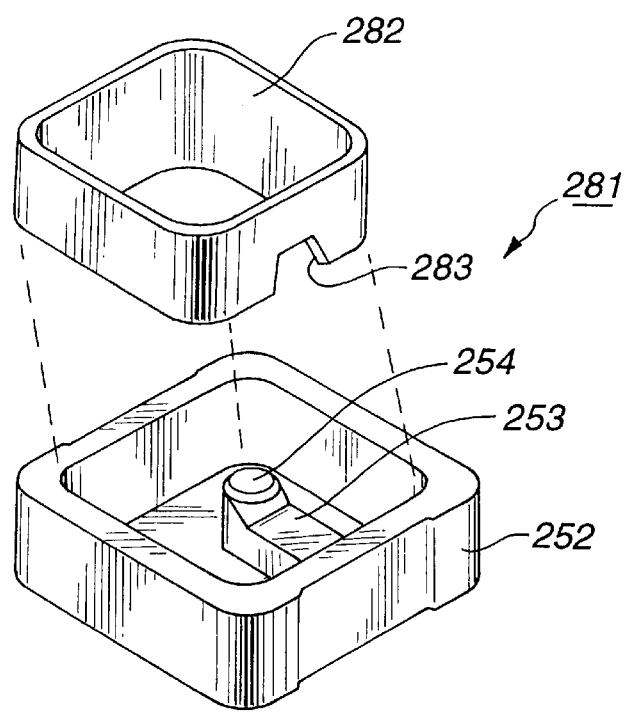
FIG. 31 is an exploded perspective view showing another example of the spacer member.

The spacer member 251 supporting the magnetic head 155 is not limited to the above-described configuration in which the magnetic shielding member 255 is insert-molded in the main spacer member 252. For example, it is possible to use a magnetic shielding member 282 prepared independently of a spacer member 281, as shown in FIG. 31. This magnetic shielding member 282 is a tubular member of a rectangular cross-section having a size sufficient to fit along the inner peripheral surface of the main spacer member 252. The magnetic shielding member 282 is formed of a high-permeability magnetic material. The magnetic shielding member 282 has cut-outs 283 in register with a protuberance 253 formed on the inner peripheral surface of the main spacer member 252. Since the cut-out 283 as a clearance is formed in the magnetic shielding member 282, the magnetic shielding member can cover substantially the entire inner peripheral surface of the main spacer member 252.

Figure 32:
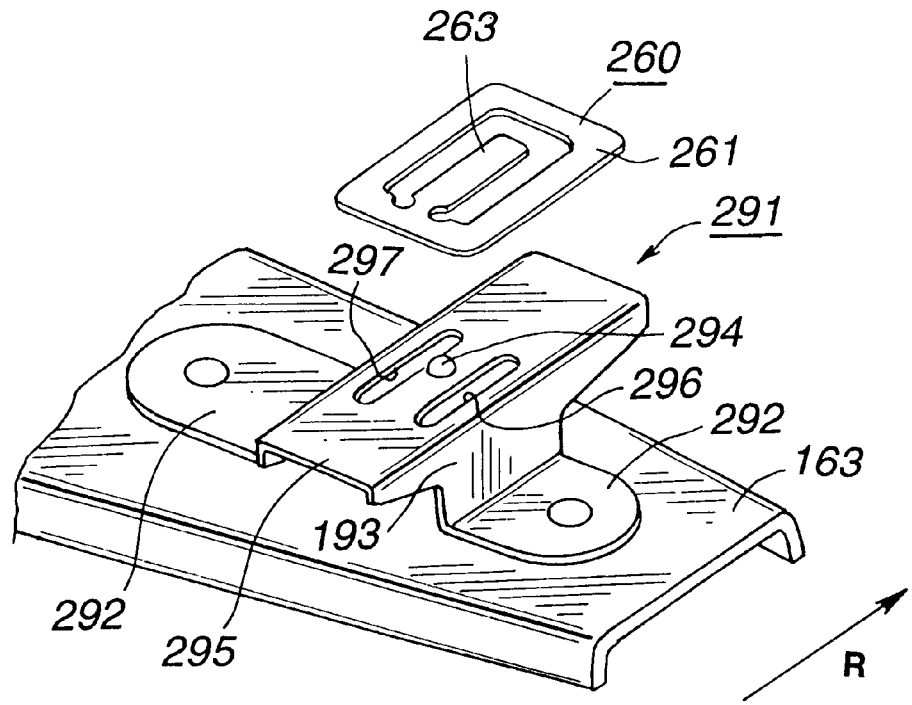
FIG. 32 is an exploded perspective view showing yet another example of the spacer member.

The spacer member may also be a spacer member 291 formed of a plate material as shown in FIG. 32. The spacer member 291, shown in FIG. 32, is made up of paired mounting pieces 292, 292, side pieces 293, 293 formed upright as-one with the mounting pieces 292, 292 and a gimbal spring mounting piece 295 formed on the side pieces 293, 293 and which has a center pivot 294. The mounting pieces 292, 292 are mounted on the head supporting spring 163 constituting the first head supporting arm 152 and the second head supporting arm 153 of the magnetic head apparatus 151. This spacer member 291 is formed from a thin metal sheet which is punched and warped to form a unitary structure made up of the mounting pieces 292, 292, side pieces 293, 293, pivot 294 and the gimbal spring mounting piece 295. The gimbal spring mounting piece 295 of the spacer member 291 is formed with paired first and second apertures 296, 297 which run parallel to the tangential direction R of the recording track formed on the first or second magnetic disc 42 or 62 when the spacer member 291 is mounted on the head supporting spring 163 to constitute the magnetic head apparatus 151. The first aperture 296 has a size sufficient to permit the first and second legs 229, 230 of the core unit 208 to be passed therethrough and the second aperture 297 has a size sufficient to permit the third to fifth legs 231 to 233 of the core unit 208 to be passed therethrough.

The spacer member 291 is mounted in position by securing the mounting pieces 292, 292 to the head supporting spring 163 with fasteners, such as set screws.

Figure 33:
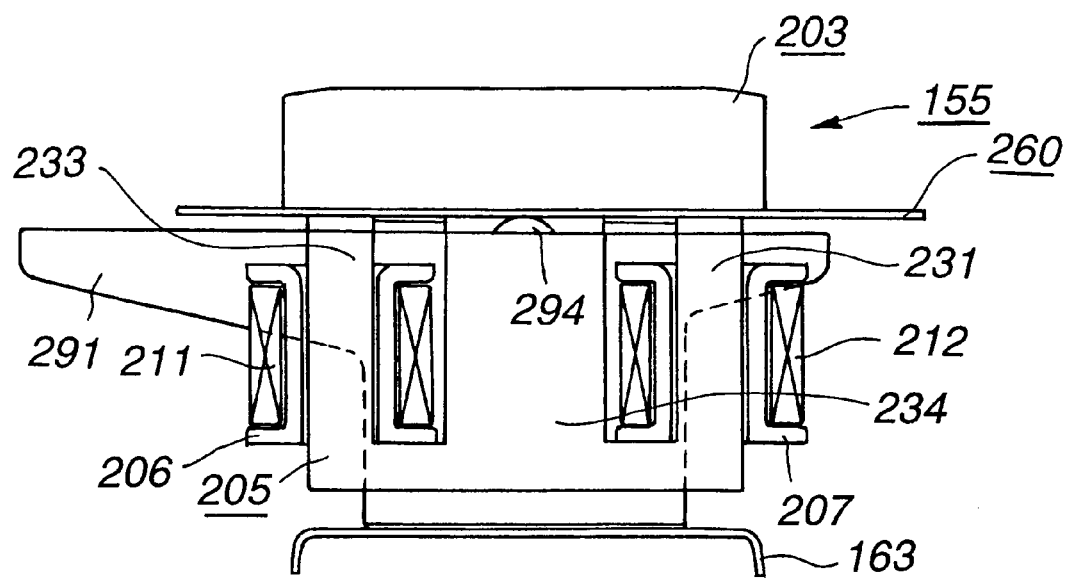
FIG. 33 is a side view of a magnetic head employing the spacer member shown in FIG. 32.

In the magnetic head 155, supported via gimbal spring 260 on the spacer member 291, the core forming member 205 is arranged by passing the first and second legs 229, 230 in the first aperture 296 of the spacer member 291 and by passing the third to fifth legs 231 to 233 in the second aperture 297. As in the above-described magnetic head 155, first and second col supporting members 206, 207 are mounted on the core forming member 205 to constitute the core unit 208. On the distal ends of the first to fifth legs 229 to 233 of the core unit 208 is integrally mounted the head slider 203 mounted on a head mounting portion 263 of the gimbal spring 260, as shown in FIG. 33, the gimbal spring 260, carrying the head slider 203, is mounted on the spacer member 291 by having the annular frame 261 being secured on the gimbal spring mounting piece 295 of the spacer member 291. At this time, the lower surface of the free end of the head mounting portion 263 is supported by the pivot 294.

Figure 34:
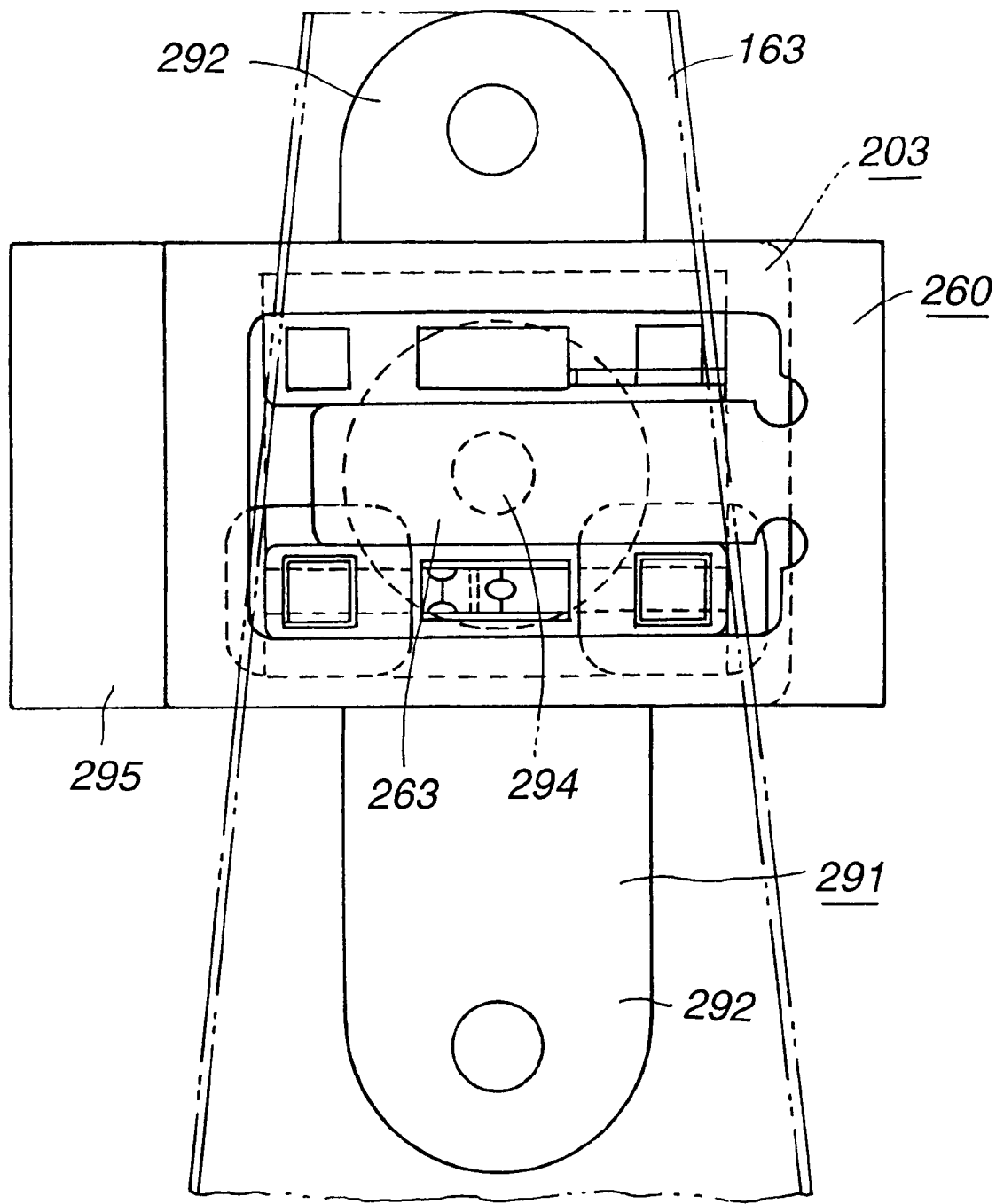
FIG. 34 is a plan view showing a magnetic head employing the spacer member shown in FIG. 32.

In the state of FIGS. 33 and 34, the gimbal spring 260 is shown detached from the gimbal spring mounting piece 295. If the gimbal spring 260 is mounted on the spacer member 291, the annular frame 261 is secured to the gimbal spring mounting piece 295.

The spacer member 291 is of a height such that, when the magnetic head 155 is at the position of recording/reproducing information signals on or from the first or second magnetic disc 42 or 62, the first head supporting arm 152 or the second head supporting arm 153 is not contacted with the first or second disc cartridge 41 or 61 loaded on the cartridge loading unit 104.

Figure 35:
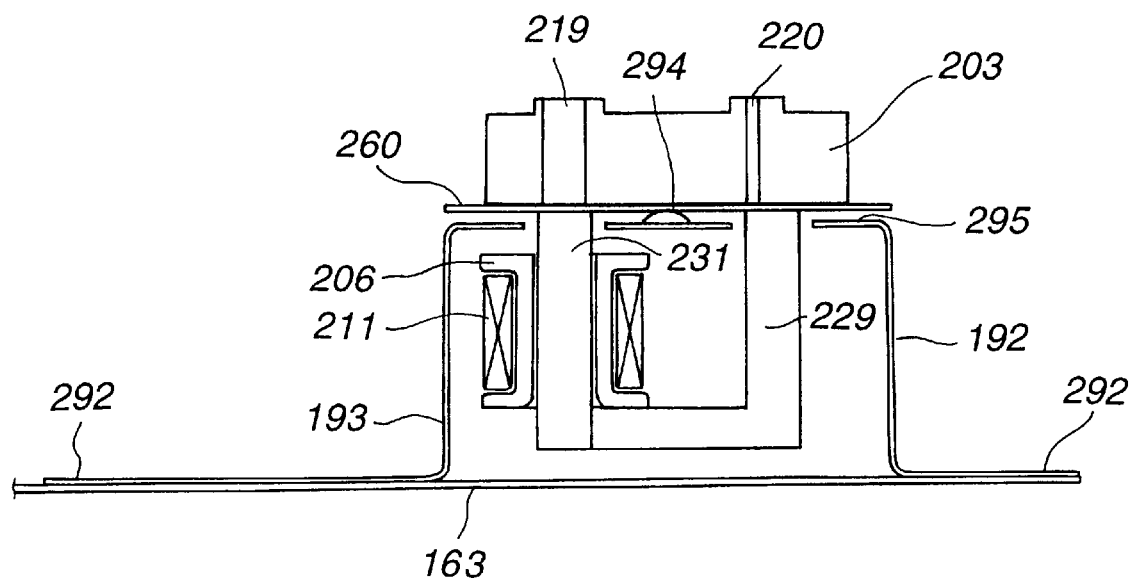
FIG. 35 is a front view of the magnetic head employing the spacer member shown in FIG. 32.

Since the head mounting portion 263 is rotationally displaced about the support point of the pivot 294, as shown in FIGS. 33 and 35, the magnetic head 155, supported by the distal end of the head mounting portion 263 using the above-described spacer member 291 is rotationally displaced so as to follow up with the surface deviation of the first or second magnetic disc 42 or 62.

In the magnetic head 155, shown herein, the gimbal spring 260 a arranged between the head slider 203 and the core unit 208, so that the magnetic head is pivotally displaced about the intermediate portion in the height-wise direction of the magnetic head 155 as center, and hence the force of rotation of the entire magnetic head 155 is reduced to reduce the amount of pivotal displacement of the magnetic head. Thus, when the vibration applied from outside the magnetic disc apparatus or the vibration transmitted from the rotating first or second magnetic disc 42 or 62 is removed, the magnetic head can be pivotally displaced immediately in order to follow up with the surface deviation of the first or second magnetic disc 42 or 62 and in order to access correctly the d recording track of the first or second magnetic disc 42 or 62.

Since the spacer member 291 shown in FIG. 32 is formed by warping a thin metal sheet, it can be reduced in weight as compared to the member formed entirely of synthetic resin and hence the distal end portion of the first head supporting arm 152 and the second head supporting arm 153 of the magnetic head apparatus 151 employing this spacer member 291 can be reduced in weight, the magnetic head accessing the first or second magnetic disc 42 or 62 can be improved in movement or floating characteristics.

Figure 36:
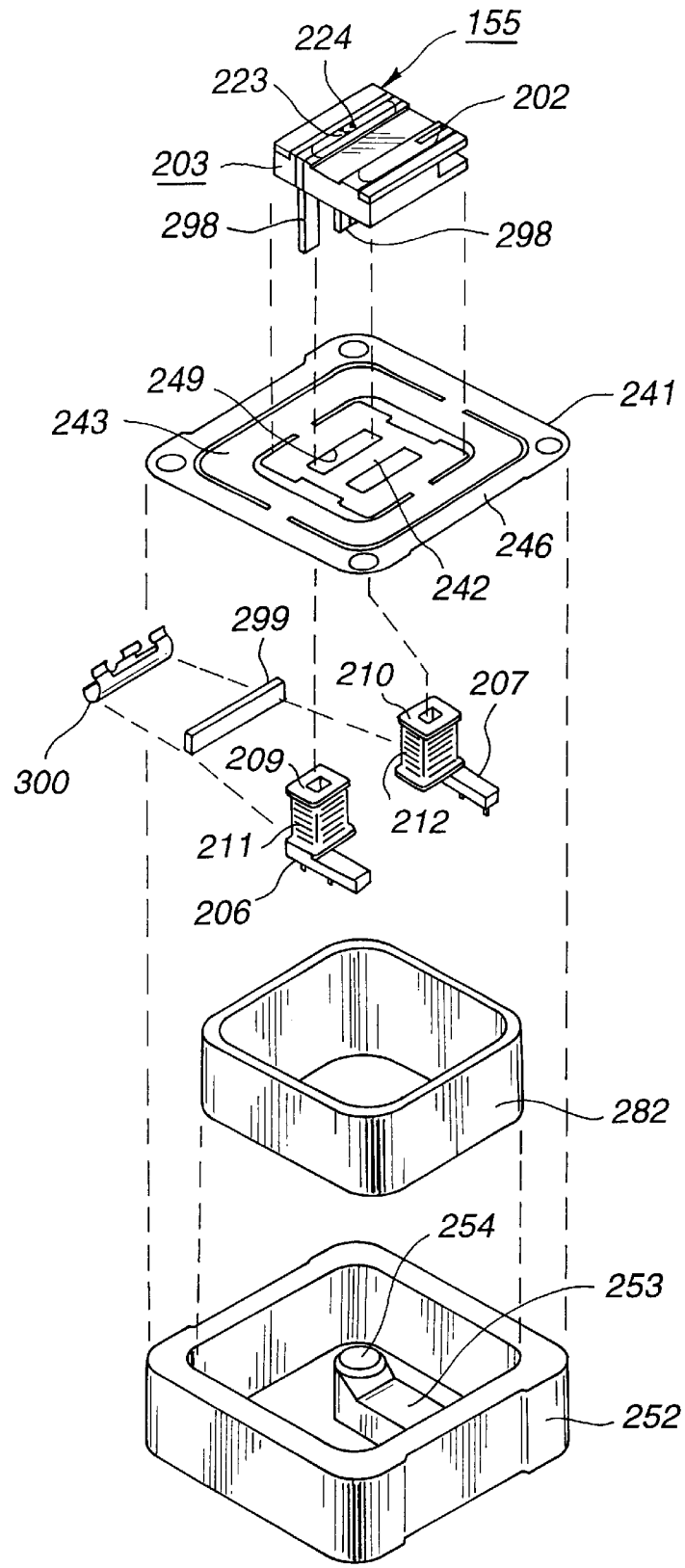
FIG. 36 is an exploded perspective view showing a head slider integrally carrying a core.
Figure 37:
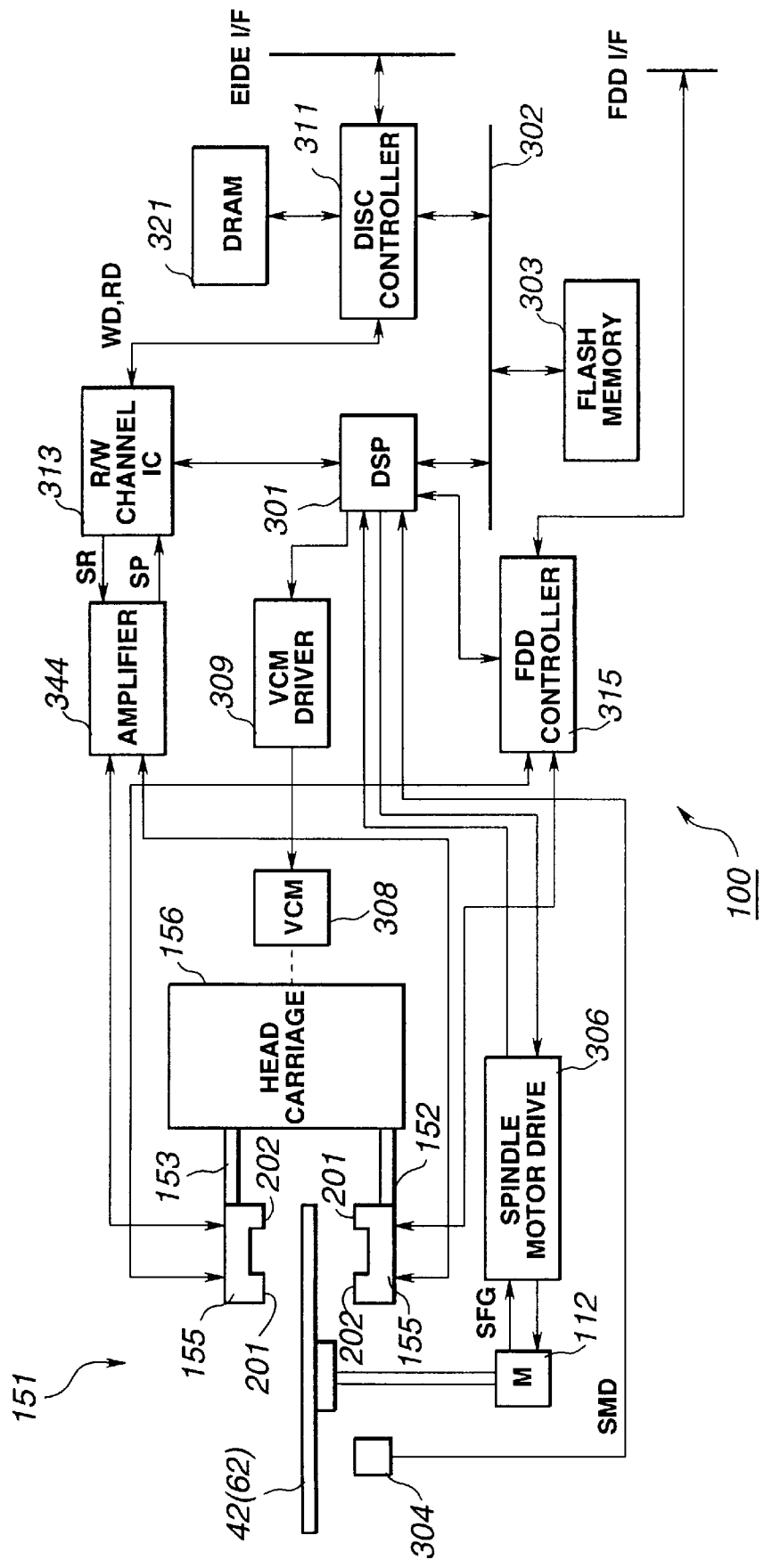
FIG. 37 is a block circuit diagram showing a recording/reproducing system of the magnetic disc apparatus according to the present invention.

The core portion constituting the magnetic head 155 according to the present invention may be formed as-one with the head slider 203, as shown in FIG. 36. In the magnetic head 155, shown in FIG. 36, cores 298 are extended downwards from the lower portions of the recording/reproducing head 223 and the erasure head 224. These cores are passed through the first aperture 249 formed in the gimbal spring 241 to attach the head slider 203 to the head mounting portion 242. In this state, the core 298 is projected from the surface of the head mounting portion 242 of the gimbal spring 241 carrying the head slider 203 and the first and second coil supporting members 206, 207 are mounted on the projected portion.

A back core 299 is mounted via a mounting member 300 on the core 298 carrying the first and second coil supporting members 206, 207. The gimbal spring 241 is mounted on the spacer member 251 in a state in which the head slider 203 formed as-one with the core 298 is mounted on the head mounting portion 242.

In the above-described magnetic head, since the gimbal spring 241 is mounted between the head slider 203 and the core 298, the magnetic head 155 is pivotally displaced about the mid portion in the height-wise direction of the magnetic head 155 as center, thus reducing the force of rotation and the amount of pivotal displacement of the magnetic head 155 in its entirety. Thus, when the vibration applied from outside the magnetic disc apparatus or the vibration transmitted from the rotating first or second magnetic disc 42 or 62 is removed, the magnetic head can be pivotally displaced immediately in order to follow up with the surface deviation of the first or second magnetic disc 42 or 62 and in order to access correctly the recording track of the first or second magnetic disc 42 or 62.

The state in which the first or second magnetic disc 42 or 62 is loaded on the magnetic disc apparatus 151 carrying the above-described magnetic head 155 on the distal end of the first and second head supporting arms 152, 153 is hereinafter explained.

The magnetic disc apparatus 100 according to the present invention includes a digital signal processor (DSP) 301 as a controller for the entire apparatus. The DSPO 301 performs rotational control of the first or second magnetic disc 42 or 62 loaded on the disc table 114, movement control of the magnetic head apparatus 151, and control of the recording/reproducing system for the second magnetic head 62 for high density recording of information signals. The DSP 301 is connected to the bus 302. The DSP 301 fetches the program stored in a flash memory 303 connected in circuit and performs control in accordance with the fetched program.

The magnetic disc apparatus 100 also includes a disc type detection unit 304 for detecting whether the magnetic disc loaded on the disc table 114 is the first magnetic disc 42 for recording information signals at a high recording density or a second magnetic disc 62 for recording information signals at a second recording density higher than the first recording density depending on detection holes 52, 73 provided in the main cartridge body units 47, 67. An output signal of the disc type detection unit 304 is sent as a mode signal SMD to the DSP 301. The DSP 301 is responsive to this mode signal SMD to control the switching of the first or second magnetic disc 42 or 62 loaded on the disc table 14 of the disc rotation unit 111.

The magnetic disc apparatus 100 according to the present invention includes a spindle motor 112 for rotating the floppy disc 11 of the disc rotation unit 111 adapted for rotationally driving the first or second magnetic disc 42 or 62 and a motor control circuit 306 for driving the motor 112. The frequency signal SFG of the frequency corresponding to the rpm of the spindle motor 112, derived from the spindle motor 112, is sent via a motor driving circuit 306 to the DSP 301. The DSP 301 refers to the frequency signal SFG to control the motor driving circuit 306 so that the rpm of the first or second magnetic disc 42 or 62 loaded on the disc table 114 will reach a predetermined value.

The magnetic disc apparatus 100 also includes a voice coil motor (VCM) 308 for radially moving the main head carriage unit 156 connected to the first head supporting arm 152 and the second head supporting arm 153 carrying the magnetic heads 155, 155 constituting the magnetic head apparatus 151 and a VCM driver 308 for driving the VCM 308. The DSP 301 controls the VCM driver 309, based on the tracking information of the magnetic head apparatus 151 outputted from the R/W channel IC 313 as later explained so that the magnetic head apparatus 151 will be correctly positioned on the target track of the first or second magnetic disc 42 or 62.

The magnetic disc apparatus 100 includes a recording/reproducing system for high density recording employing the second magnetic disc 62 and a recording/reproducing system for standard density recording employing the first magnetic disc 42. The recording/reproducing system for high recording density (upper order mode) includes a disc controller 311 for exchanging data, status and commands with the host computer side, a dynamic random access memory (DRAM) 312 as a data buffer, a R/W channel IC 313 for processing recorded signal and reproduced signals and an amplifier 314 having an amplifier for amplifying recorded signals outputted from the R/W channel IC 313 to send the amplified signal to the second head chip 202 for high recording density (upper order mode) provided on the head slider 203 of the magnetic heads 155, 155 and a playback amplifier for amplifying the reproduced signal of the second head chip 202 to send the amplified signal to the R/W channel IC 313.

The disc controller 311 is connected to a bus 302. The operation of the disc controller 311 and the R/W channel IC 313 is controlled by the DSP 301. The disc controller 311 is connected to a host computer, not shown, via an extended intelligent drive electronics (EIDE) interface.

The magnetic disc apparatus 100 of the present invention includes a FDD controller 315 as a recording/reproducing system for standard recording density for recording/reproducing information signals on or from the fist magnetic disc 42 of the first recording density. This FDD controller 315 is connected to the host computer, not shown, via a floppy disc drive (FDD) interface. This FDD controller 315 has the function of generating recorded signals from MFM modulated data sent from the host computer during recording of information signals in order to send the recorded signals to the recording/reproducing head 223 of the first head chip 201 of the magnetic heads 155, 155, and the function of deriving MFM modulated data from the playback signals from the recording/reproducing head 223 during playback to send the data to the host computer.

The operation of the magnetic disc apparatus according to the present invention is hereinafter explained.

When the first disc cartridge 42 housing the first magnetic disc 42 of the standard recording density is loaded on the magnetic disc apparatus, the mode signal SMD sent from the disc type detection unit 304 to the DSP 301 indicates the lower order mode. Thus, the motor driving circuit 306 is controlled by the DSP 301 based on the frequency signal SFG from the spindle motor 112 of the disc rotation unit 111, so that the first magnetic disc 42 is run in rotation at a standard rpm of 300 as an example. Also, under control by the DSP 301, the recording/reproducing system for standard recording density as the first recording density is in a usable state.

As the magnetic heads 155, 155 are in contact with the major surfaces of the first magnetic disc 42, MFM modulated data as writing data is sent from the host computer via FDD interface to the FDD controller 315. This FDD controller 315 outputs recorded signals, corresponding to the MFM modulated data, to the first recording/reproducing head 223 of the first head chip 201, so as to be recorded in a predetermined sector of a target track of the first magnetic disc 42. For reproducing the information recorded on the first magnetic disc 42, signals reproduced by the recording/ reproducing head 223 of the first head chip 201 from the predetermined sector of the target track of the first magnetic disc 42 are sent to the FDD controller 315 which then outputs MFM modulated data corresponding to the reproduced signals to the host computer.

The operation when the second disc cartridge 61 holding the second magnetic disc 62 adapted for recording information signals at a second recording density higher than the first recording density is hereinafter explained.

On loading the second disc cartridge 62, the mode signal SMD sent by the disc type detection unit 304 to the DSP 301 indicates an upper order mode. This controls the motor driving circuit 306 by the DSP 301 based on the frequency signal SFG from the spindle motor 112 so that the second magnetic disc 62 loaded on the disc table 114 is run in rotation at an elevated speed of, for example, 3600 rpm. Also, the recording/reproducing system for high density recording (upper order mode) is in a usable state, under control by the DSP 301.

During the recordable state for information signals, in which the magnetic heads 155, 155 are proximate to the major surfaces of the magnetic disc 62, writing data is sent to the disc controller 311 from the host computer using the EIDE interface so as to be transiently stored in the DRAM 312. The writing data is processed by the disc controller 311 for appendage of the error correction code or interleaving to generate writing data WD.

For recording in a predetermined sector of the target track of the second magnetic disc 62, writing data WD is sent from the disc controller 311 to the R/W channel IC 313 which then outputs recorded signals SR in association with the writing data WD. The output recorded signals SR are sent via recording amplifier of the amplifier unit 314 to the second head chip 202 provided on the head slider 203 of the magnetic heads 155, 155 for recording on the predetermined sector of the target track of the second magnetic disc 62.

For reproducing information signals recorded on the second magnetic disc 62, signals reproduced by the second head chip 202 from the predetermined sector of the target track of the second magnetic disc 62 are amplified by the playback amplifier of the amplifier unit 314 and thence sent to the R/W channel IC 313. The amplified signals are processed by the R/W channel IC 313 with waveform equalization, data discrimination or 16/17 code decoding to derive readout data RD. This readout data is sent to the disc controller 311 for deinterleaving or error correction to derive ultimate read-out data which is unidirectionally stored in the DRAM 312 before being sent to the host computer.

With the above-described magnetic disc apparatus of the present invention, when the first magnetic disc 42 of the first recording density for standard recording density (lower order mode) is loaded thereon, information signals are recorded or reproduced in a state in which the recording/reproducing head 223 of the first head chip 201 of the magnetic heads 155, 155 is contacted with the signal recording portion formed on the major surface of the first magnetic disc 42. If the second magnetic disc having a second recording density higher than the first recording density (upper order mode) is loaded on the magnetic disc apparatus, the information signals are recorded or reproduced in a state in which the head slider 203 constituting the magnetic heads 155, 155 is floated from the major surfaces of the second magnetic disc 62 carrying the signal recording portion.

That is, the magnetic disc apparatus of the present invention can record or reproduce information signals not only on the second magnetic disc 62 having the high recording density but on the first magnetic disc having the standard recording density, thus assuring lower order compatibility.

What is claimed is:

1. A magnetic disc apparatus for driving a magnetic disc having a signal recording portion on its major surface, comprising:

a base block;

a main head carriage mounted for movement on said base block;

a supporting arm having its one end supported by said main head carriage;

a spacer mounted on a side on the opposite end of said supporting arm, said side facing said magnetic disc;

a pivoting member having a portion for mounting and a pivoting portion pivotable relative to said portion for mounting, said portion for mounting being mounted at a position of said spacer spaced a predetermined distance from said supporting arm in a direction perpendicular to the major surface of the magnetic disc; and a magnetic head supported by said pivoting portion of said pivoting member, a portion of the magnetic head being held within the spacer.

2. The magnetic disc apparatus according to claim 1 wherein said magnetic disc is rotatably housed in a cartridge and wherein a portion of the major surface of the magnetic disc is exposed to outside via an aperture formed in said cartridge.

3. The magnetic disc apparatus according to claim 1 wherein said pivoting portion is a flat-plate-shaped member, on one surface of which is supported said magnetic head, and wherein a pivot for supporting a point of the opposite surface of said pivoting portion is provided on said spacer.

4. The magnetic disc apparatus according to claim 1 further comprising:

a disc holding member for detachably holding, as said magnetic disc, a first magnetic disc for recording information signals at a first recording density or a second magnetic disc for recording information signals at a second recording density higher than the first recording density;

said magnetic head having a first transducer for accessing said first magnetic disc and a second transducer for accessing said second magnetic disc.

5. The magnetic disc apparatus according to claim 1 wherein said spacer is a member separate from the supporting arm.

6. A magnetic disc apparatus for driving a magnetic disc having a signal recording portion on its major surface, comprising:

a base block;

a main head carriage mounted for movement on said base block;

a supporting arm having its one end supported by said main head carriage;

a spacer mounted on a side on the opposite end of said supporting arm, said side facing said magnetic disc;

a pivoting member having a portion for mounting and a pivoting portion pivotable relative to said portion for mounting, said portion for mounting being mounted at a position of said spacer spaced a predetermined distance from said supporting arm in a direction perpendicular to the major surface of the magnetic disc; and a magnetic head supported by said pivoting portion of said pivoting member, wherein said magnetic head has a slider and a core unit and is supported by said pivoting portion in such a state in which said slider is positioned on the side of said pivoting member opposite to said supporting arm for facing said magnetic disc and in which said core unit is positioned on the side of the pivoting member towards said supporting arm.

7. The magnetic disc apparatus according to claim 6 further comprising:
   a disc holding member for detachably holding, as said magnetic disc, a first magnetic disc for recording information signals at a first recording density or a second magnetic disc for recording information signals at a second recording density higher than the first recording density;
   said magnetic head having a first transducer for accessing said first magnetic disc and a second transducer for accessing said second magnetic disc; and
   a core of said first transducer is formed on said core unit and a core of said second transducer is formed on said slider.

8. The magnetic disc apparatus according to claim 6 wherein said core unit is arranged in said spacer.

9. The magnetic disc apparatus according to claim 7 wherein said spacer has a magnetic shielding member.

10. A magnetic disc apparatus for driving a magnetic disc having a signal recording portion on its major surface, comprising:
    a base block;
    a main head carriage mounted for movement on said base block;
    a supporting arm having its one end supported by said main head carriage;
    a spacer mounted on a side on the opposite end of said supporting arm, said side facing said magnetic disc;
    a magnetic head, a portion of the magnetic head being held within the spacer;
    a supporting member mounted at a predetermined spacing from a side on said opposite end of said supporting arm, said side facing the major surface of the magnetic disc, in a direction perpendicular to the major surface of the magnetic disc, said supporting member operating for orienting the magnetic head so as to follow the major surface of the magnetic disc.

11. The magnetic disc apparatus according to claim 10 wherein said magnetic disc is rotatably housed in a cartridge and wherein a portion of the major surface of the magnetic disc is exposed to outside via an aperture formed in said cartridge.

12. The magnetic disc apparatus according to claim 10 wherein said supporting member supports a pivoting member pivotably supporting said magnetic head.

13. The magnetic disc apparatus according to claim 10 further comprising:
    a disc holding member for detachably holding, as said magnetic disc, a first magnetic disc for recording information signals at a first recording density or a second magnetic disc for recording information signals at a second recording density higher than the first recording density;
    said magnetic head having a first transducer for accessing said first magnetic disc and a second transducer for accessing said second magnetic disc.

14. A magnetic disc apparatus for driving a magnetic disc having a signal recording portion on its major surface, comprising:
    a base block;
    a main head carriage mounted for movement on said base block;
    a supporting arm having its one end supported by said main head carriage;
    a magnetic head;
    a spacer mounted on a side on the opposite end of said supporting arm, said side facing said magnetic disc;
    a supporting member mounted at a predetermined spacing from a side on the opposite end of said supporting arm, said side facing the major surface of the magnetic disc, in a direction perpendicular to the major surface of the magnetic disc, said supporting member operating for orienting the magnetic head so as to follow the major surface of the magnetic disc,
    wherein said supporting member supports a pivoting member pivotably supporting said magnetic head, and
    wherein said magnetic head has a slider and a core unit and is supported by said pivoting member in such a state in which said slider is positioned on the side of said pivoting member opposite to said supporting arm for facing said magnetic disc and in which said core unit is positioned on the side of the pivoting member towards said supporting arm.

15. The magnetic disc apparatus according to claim 14 further comprising:
    a disc holding member for detachably holding, as said magnetic disc, a first magnetic disc for recording information signals at a first recording density or a second magnetic disc for recording information signals at a second recording density higher than the first recording density;
    said magnetic head having a first transducer for accessing said first magnetic disc and a second transducer for accessing said second magnetic disc;
    a core of said first transducer is formed on said core unit and a core of said second transducer is formed on said slider.

16. The magnetic disc apparatus according to claim 14 wherein said core unit is arranged in said spacer.

17. A magnetic disc apparatus for driving a magnetic disc having a signal recording portion on its major surface, comprising:
    a base block;
    a main head carriage mounted for movement on said base block;
    a supporting arm having its one end supported by said main head carriage;
    a spacer on the opposite end of said supporting arm;
    a magnetic head including a slider, a core unit, a first transducer having a first core and adapted for accessing information signals at a first recording density, and a second transducer having a second core and adapted for accessing information signals at a second recording density higher than said first recording density; a magnetic gap of the first transducer and a magnetic gap of the second transducer being formed on a surface of said magnetic head facing the major surface of the magnetic disc, a portion of the magnetic head being held within the spacer; and
    a flat-plate-shaped pivoting member for pivotably supporting said magnetic head with respect to said supporting arm so that said slider and the core unit are disposed towards one and the opposite surfaces of the pivoting member;

said first core being arranged in said core unit and said second core being in said slider.

18. The magnetic disc apparatus according to claim 17 wherein the magnetic disc is rotatably housed in a cartridge and a portion of the major surface of the magnetic disc is exposed to outside via an aperture formed in said cartridge.

19. A magnetic disc cartridge for driving a magnetic disc having a signal recording portion on its major surface, comprising:

a base block;

a main head carriage mounted for movement on said base block;

a supporting arm having its one end supported by said main head carriage;

a magnetic head including a slider, a core unit, a first transducer having a first core and adapted for accessing information signals at a first recording density, and a second transducer having a second core and adapted for accessing information signals at a second recording density higher than said first recording density; a magnetic gap of the first transducer and a magnetic gap of the second transducer being formed on a surface of said magnetic head facing the major surface of the magnetic disc; and a flat-plate-shaped pivoting member for pivotably supporting said magnetic head with respect to said supporting arm so that said slider and the core unit are disposed towards one and the opposite surfaces of the pivoting member;

said first core being arranged in said core unit and said second core being in said slider; and a spacer on the opposite end of said supporting arm, said pivoting member having a point on its opposite side surface supported by a pivot provided on the spacer, wherein a pivot for supporting a point on the opposite surface of the pivoting portion is provided on the spacer.

20. The magnetic disc apparatus according to claim 19 wherein said core unit is arranged in said spacer.

21. The magnetic disc apparatus according to claim 19 wherein said spacer has a magnetic shielding member.

22. The magnetic disc apparatus according to claim 19 wherein said spacer is a member separate from the supporting arm.

* * * * *